Figure 1A:
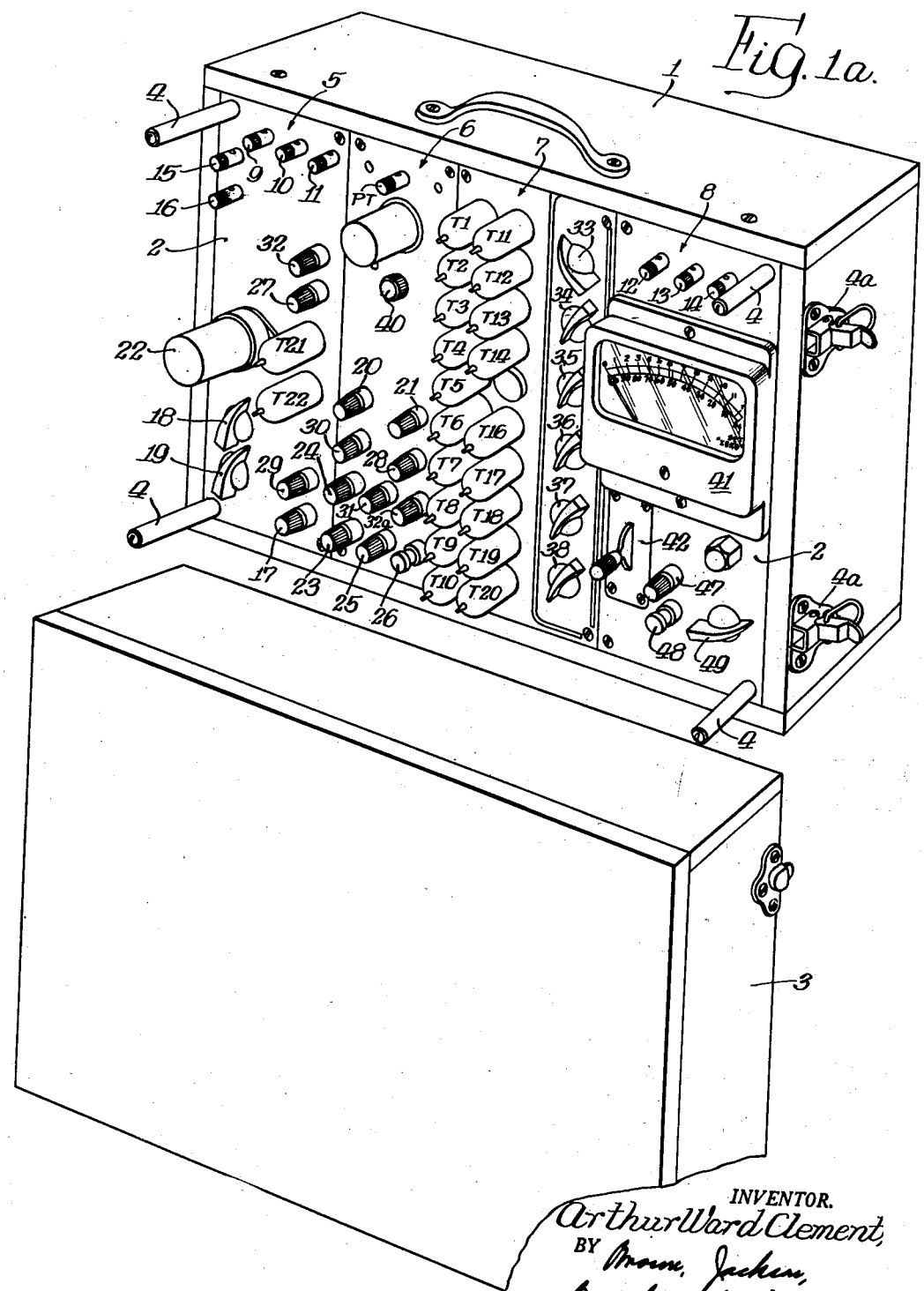
Figure 3:
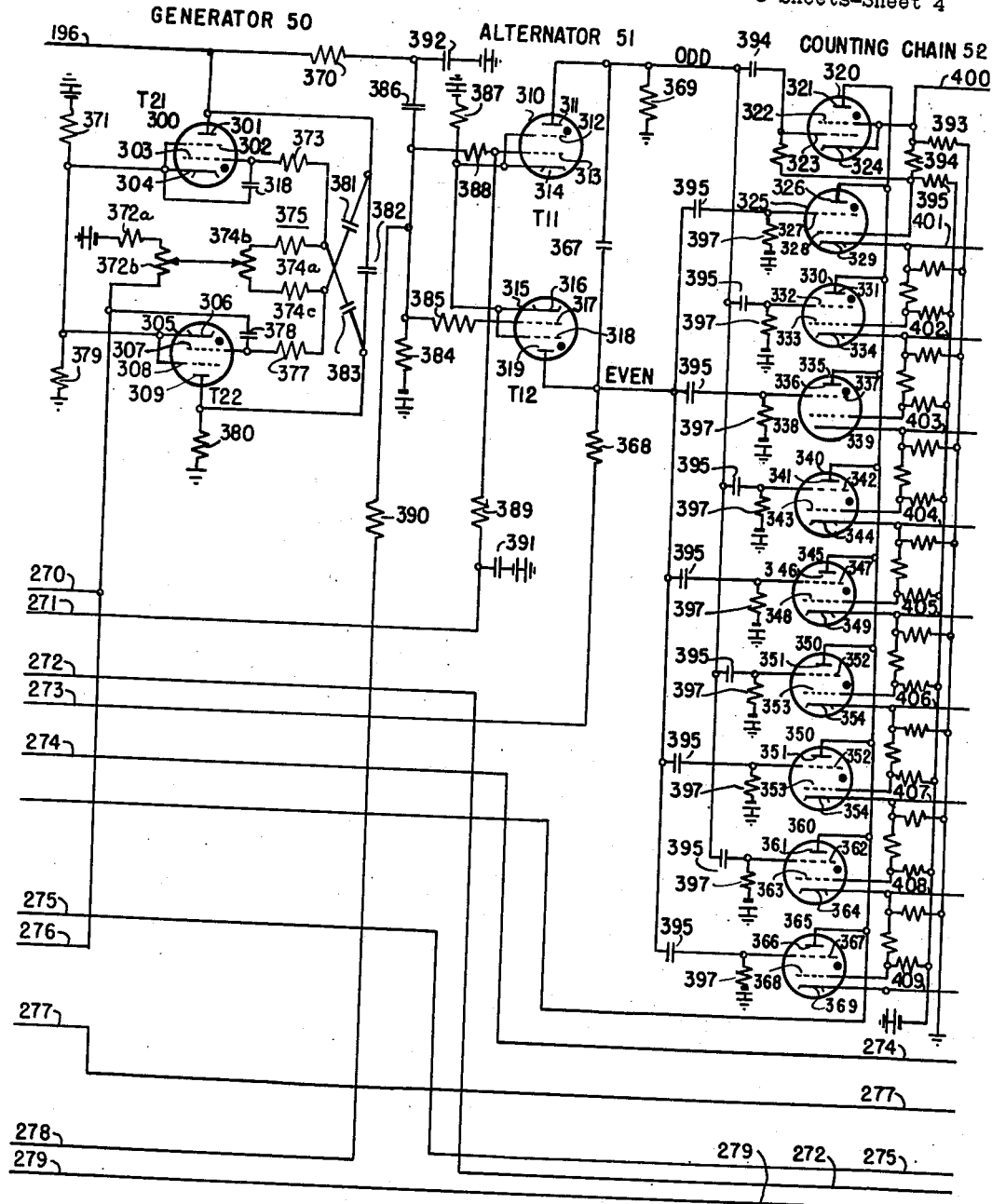
Figure 4:
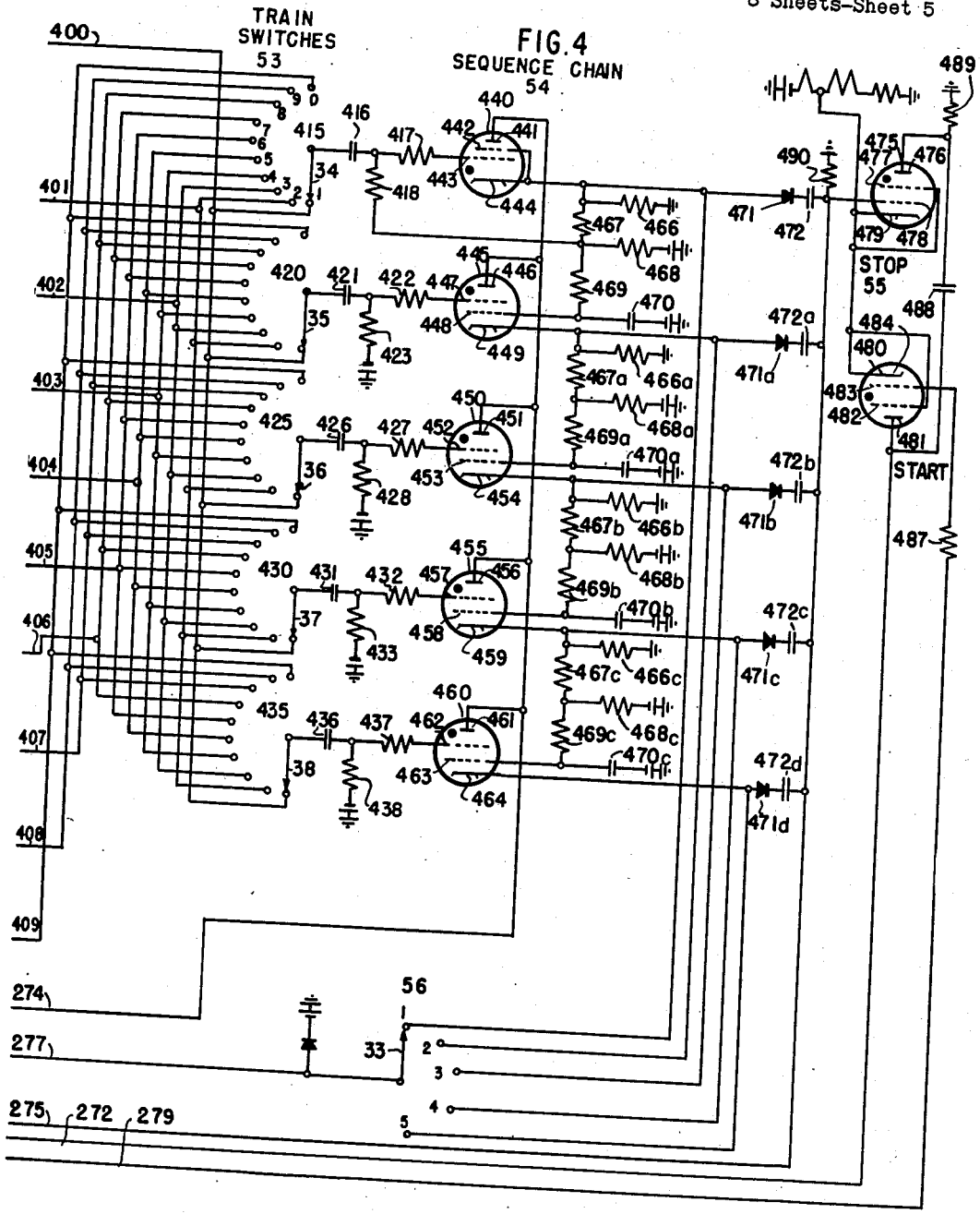

June 1, 1954

A. W. CLEMENT 2,680,161

PULSE TESTING APPARATUS

Filed Oct. 9, 1950

8 Sheets-Sheet 1

INVENTOR.
Arthur Ward Clement
BY
Attys.

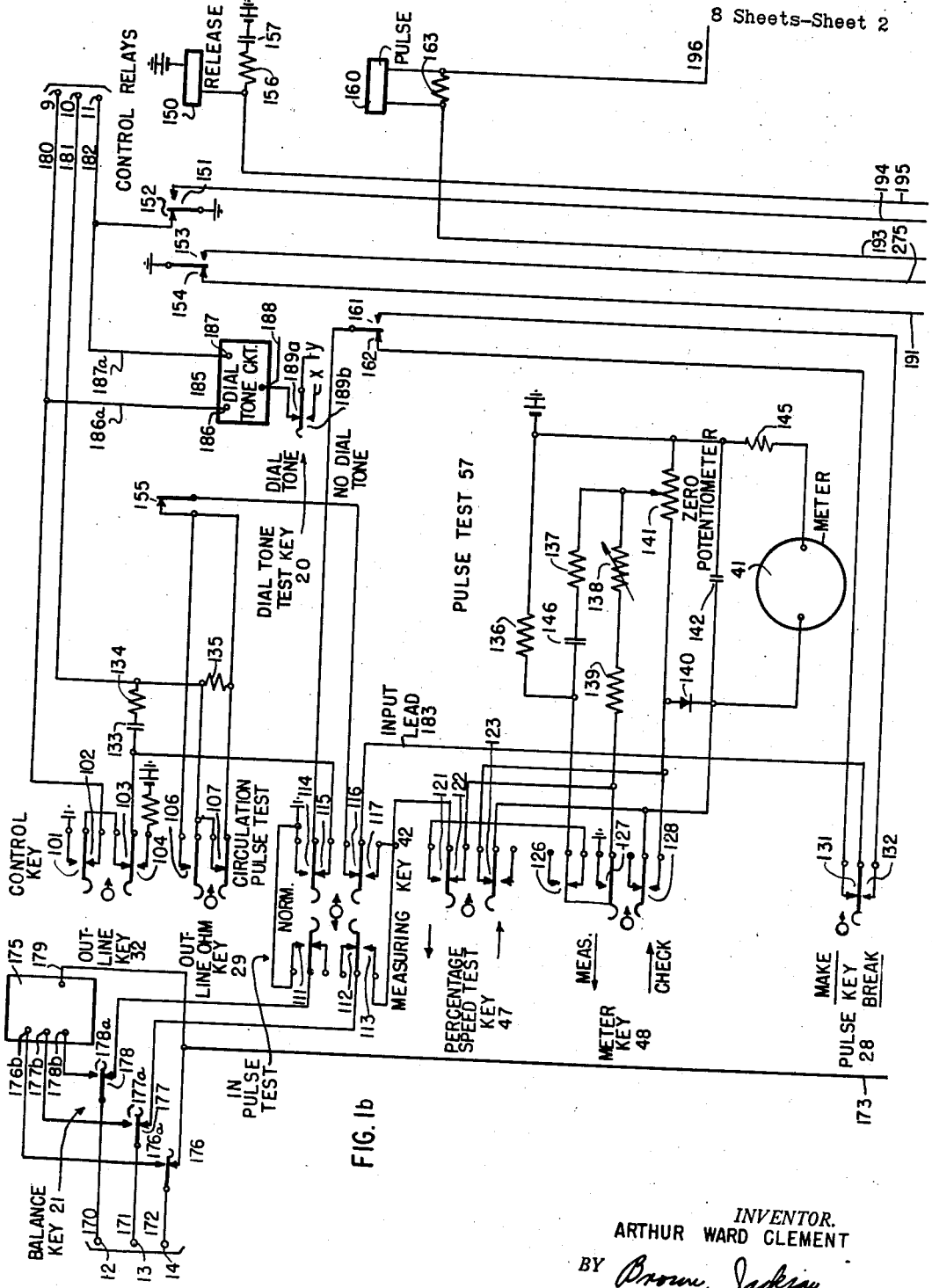

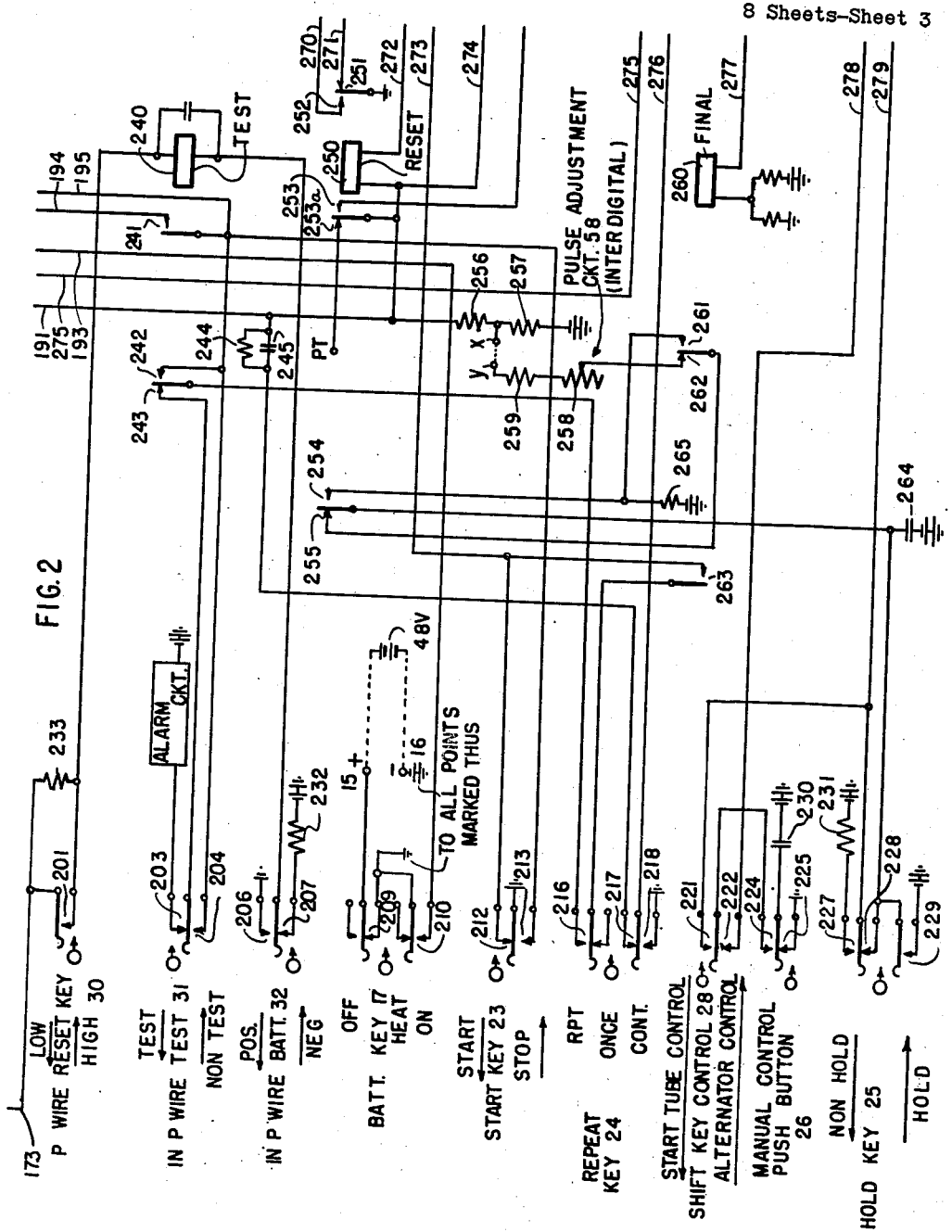

June 1, 1954  A. W. CLEMENT  2,680,161
PULSE TESTING APPARATUS
Filed Oct. 9, 1950
8 Sheets-Sheet 7

INVENTOR.
ARTHUR WARD CLEMENT
BY Brown, Jackson,
Boettcher & Dienner
ATTYS.

June 1, 1954     A. W. CLEMENT     2,680,161
PULSE TESTING APPARATUS
Filed Oct. 9, 1950                            8 Sheets-Sheet 8
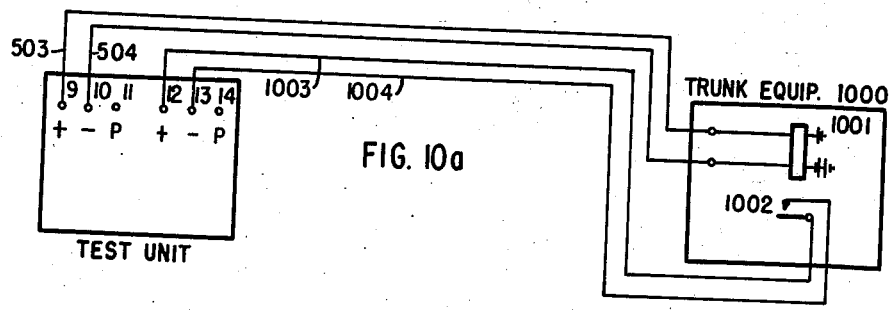
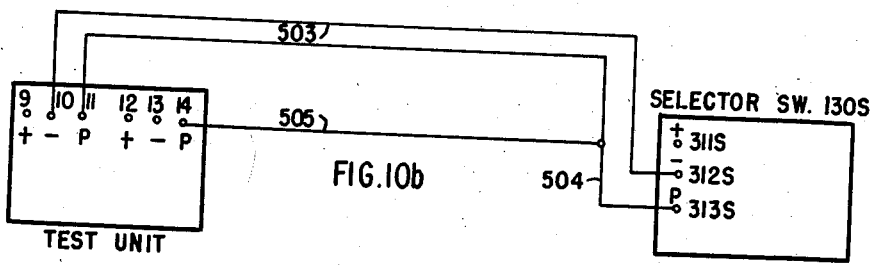
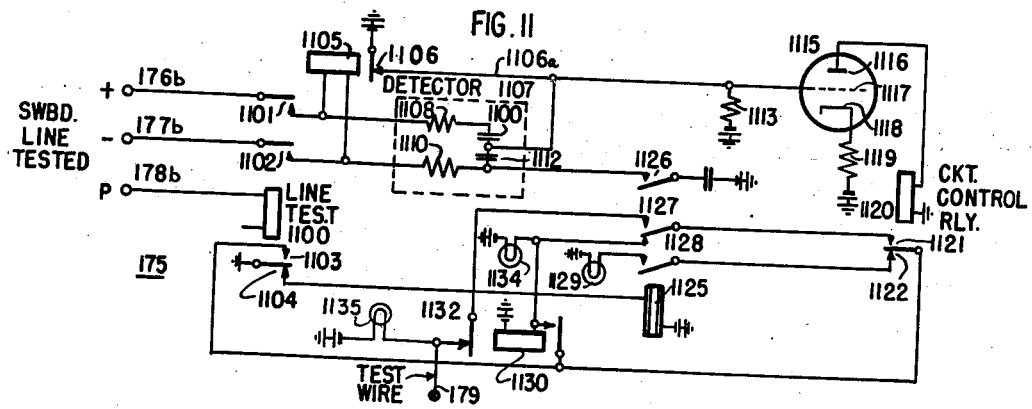
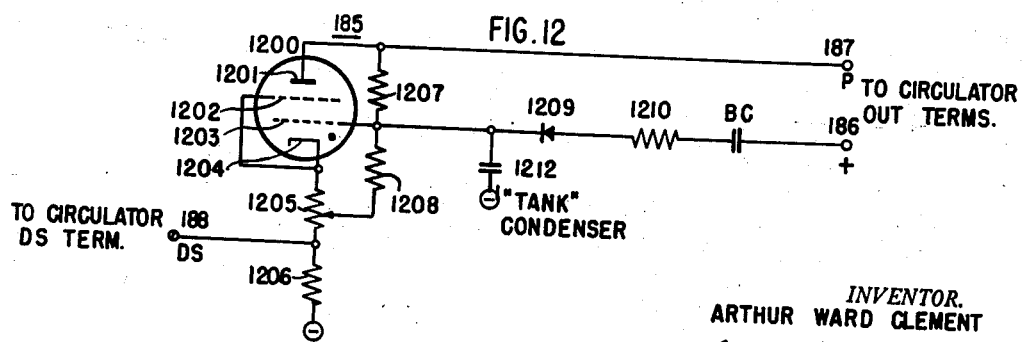
INVENTOR.
ARTHUR WARD CLEMENT
BY
ATTYS.

Patented June 1, 1954

2,680,161

UNITED STATES PATENT OFFICE 2,680,161

PULSE TESTING APPARATUS

Arthur Ward Clement, Galion, Ohio, assignor to The North Electric Manufacturing Company, Galion, Ohio, a corporation of Ohio Application October 9, 1950, Serial No. 189,279

32 Claims. (Cl. 179—175.2)

The present invention relates in general to testing apparatus, and, in particular, to portable-type testing apparatus for use with automatic telephone systems.

In an automatic telephone exchange, the extension of connection through the central office equipment is basically achieved by operation of a dial impulsing device on the subscriber substation to effect transmission of a series of impulses which are representative of the directory number of the desired party.

Successful extension of the call, responsive to the receipt of these impulses, is predicated upon the ability of the many automatic switches in the exchange to work in given time relations and in given time sequences. The ability of the automatic switches to operate in these proper time relations and sequences is, in turn, dependent upon the operating characteristics of each of the individual elements in each of the automatic switches.

In conventional automatic telephone systems, the impulses are generally transmitted by the dial units at the rate of ten pulses per second, the impulses each having a percentage break period of about 60 percent of the total impulse time. It is apparent that even slight variations in the speed and percentage break period of the pulses may cause faulty system operation, and it is therefore necessary in accomplishing successful exchange operation to maintain a fairly critical set of standards at all times for both the impulse transmitting and the impulse responsive units of the system.

In a conventional type selector or connector switch, for example (which is one of the many automatic switches of a conventional type exchange), a so-called "transfer" relay must be adjusted to hold in its operated position for the duration of the open period of each received pulse (60% of the normal pulse duration) and will restore should the occurrence of an unusually long open period occur. Accordingly, the permissible variations in the operating periods of many of the relays in the automatic equipment must be adjustable in terms of milliseconds to insure reliable and successful operation of the automatic telephone exchange.

It is apparent therefrom that the adjustment of the various operating characteristics of the switches or relays of an exchange is an extremely important and critical operation in achieving successful exchange operation; and it is the primary object of this invention to provide a portable type testing apparatus which is particularly adapted to solve the numerous problems encountered in the testing and adjustment of the various types of automatic switches and their component parts.

The achievement of these various switch or relay adjustments has long troubled the manufacturer, installer and maintenance men alike. For example, it has not proven entirely practical heretofore to test selector-type switch boards in the factory for call extension abilities and for adjustment purposes, and the provision of a simplified means for effecting routine testing of a selector type switch board as a complete unit is a definite need of the manufacturer. The testing apparatus of the invention in one of its uses is the answer to such need.

Installers on the job have also been similarly handicapped by the limited testing means which have been available heretofore, and as a result, the installer in the past was necessarily an experienced man of many years' training who used his eyes and ears to observe faulty operation of the equipment. With the provision of the simplified testing unit of the invention a less experienced installer is now able to achieve more critical and sensitive switch adjustments than has been heretofore accomplished.

Similarly, the work of installers engaged in adding new switching equipment to an expanding installation is also considerably simplified through use of the novel test equipment, the newer switches being comparatively quickly adjusted to the norms and standards of the existing switches in the exchange by use of the novel test equipment.

Maintenance men for switch board equipment are particularly aided in their achievement of continuous and reliable operation of a telephone system by constant routine testing as made possible by use of the novel test equipment.

Each type of equipment, of course, has particular and individual maintenance problems. One of the most common type of equipment failure, in a mechanical switch type office, for example, is experienced with the variation of the operating characteristics of a mechanical switch from the established norms of the system as a result of the heavy mechanical wear experienced thereby. Accordingly, to preclude and detect such failures prior to occurrence, constant examination and routining of the switches for variations from the established switch norms becomes an important part of the maintenance man's job.

In the past, routining of this type has frequently been manually accomplished through the use of hand test sets. Such method, in addition to being rather tedious and exhaustive, was inherently subject to failure due to human error.

A feature of the present invention is the manner in which the small portable test apparatus is operative to transmit variable type pulses as directory numbers (or otherwise) to various vacant lines of the exchange for routing and checking purposes. Not only are the tests accomplished more rapidly, but additionally the accuracy and reliability of the test is extremely conclusive.

Maintenance and service men assigned to relay equipment have a different type of problem. In relay equipment, operational errors, because of the highly developed nature of the relay equipment, will be cancelled out and the inactive equipment will be passed over without indicating to the subscriber or the maintenance men that a faulty condition exists. While these features are especially desirable in providing reliable service to the exchange subscribers, the passing over of sufficient inactive equipment may lead to troublesome situations in which the faults are not demonstrated until some critical point is reached. As a result, as the equipment reaches this point a considerable amount of maintenance will be required and interrupted service may result.

Such occurrence may be anticipated and precluded by occasional use of the test equipment of the disclosure to assist in detecting the individual faults as they occur and before the chronic fault condition is reached.

The equipment is of further utility to the maintenance or service man who, having made an adjustment, desires a thorough routining and testing of the equipment to test its operation. Without thorough routining and testing, the service man can never be confident that his adjustments have successfully eliminated the trouble which previously existed, and by use of the test equipment of this invention an assurance that such adjustment is successful is obtained.

Further serious problems in the adjustment of telephone exchange equipment in the field have arisen in the adaptation of existing exchanges for use with inter-toll dialling, wherein the senders and trunks of existing equipment are necessarily adjusted to the standards and norms set up for inter-roll dialling.

A feature of the testing apparatus of the present invention is the manner in which the tests of the equipment to be adapted may be readily accomplished, and the adjustment of the existing equipment for use with the inter-toll dialling equipment may be effected in a simple and expeditious manner. This particular use of the testing device promises to be of great importance in the near future as inter-toll dialling networks are more extensively developed.

The foregoing are only a few of many general and broad applications to which the test equipment of the invention may be adapted, and are only a few of the many problems which are readily solved through the use of the test unit.

Figure 5:
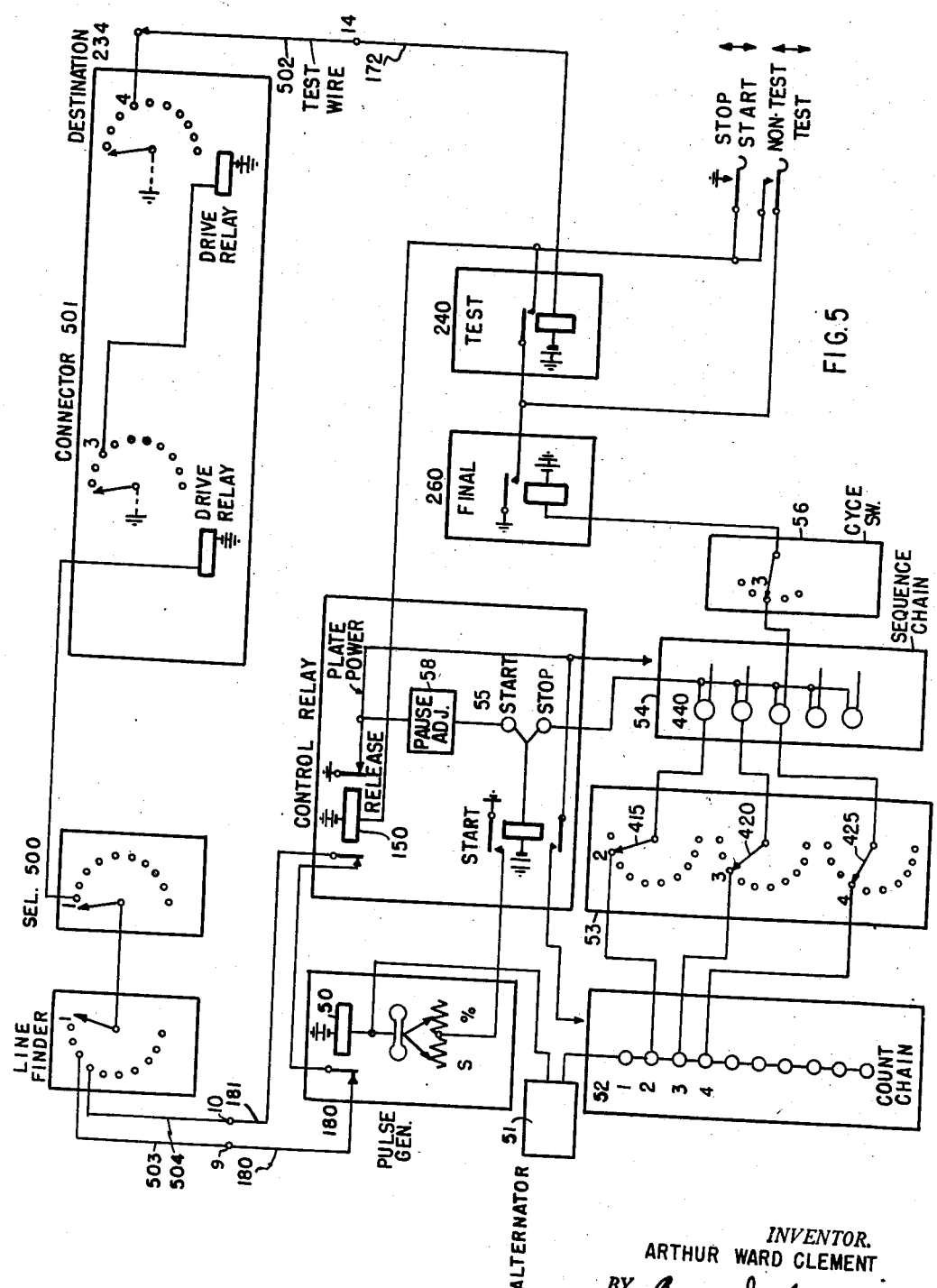
Figure 6:
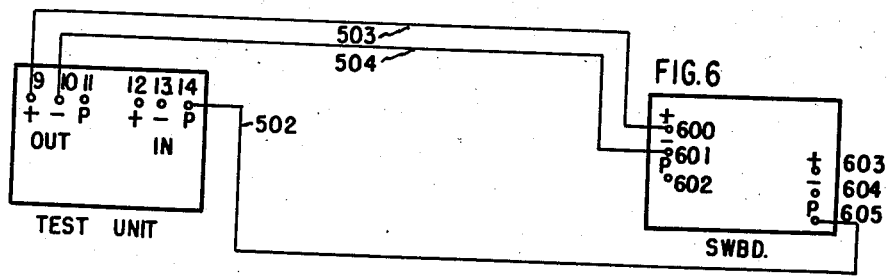
Figure 7:
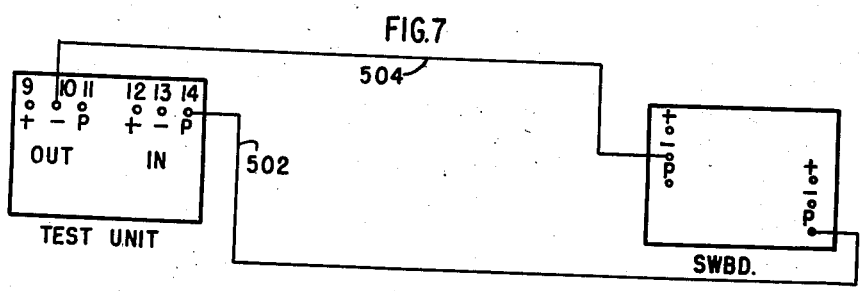

It is believed that the details of these various applications will become more apparent with reference to the following disclosures and drawings in which Figure 1A is a perspective view of the test equipment in its assembled state; Figure 1b to 4 inclusive, in their assembled form, disclose a schematic sketch of the test equipment elements; Figure 5 is a schematic sketch showing the manner of connection of the test equipment to test the switches of a nautomatic telephonic system; Figures 6 and 7 illustrate, in block form, loop and single wire connections for the test unit and an exchange installation; Figures 8, 9, 10, 10a are illustrations in block of the manner of connection of the test unit in testing individual elements of various automatic switching members; Figure 11 is a schematic sketch of a balance test circuit for use with the test equipment; and Figure 12 is a schematic circuit sketch of a dial tone test circuit for use with the test equipment.

TABLE OF CONTENTS

For purposes of attaining ready access to the description of the various portions of the equipment and the description of the various tests which may be performed with the test equipment, the following sectional headings are tabled at this point:

1. General test equipment application
2. General description
3. General operation
   3.1 Set adjustment
   3.2 Optional procedure subsequent to pulse adjustment
4. Circuit description
   4.1 General circuit operation
   4.2 Normal set condition
   4.3 Pulse adjustment
      4.31 Generator operation
      4.32 Speed-percentage circuit operation
      4.33 Metering
   4.4 Impulse transmission
      4.41 Key settings
      4.42 Initial circuit operations
      4.43 Impulse generation
      4.44 Alternator operation
      4.45 Connecting chain operation
      4.46 Sequence chain operation
   4.5 Start-stop circuit
   4.6 Cycling without testing
   4.7 Single cycle operation
   4.8 Continuous pulsing to a seized stage
   4.9 Manually controlled pulsing
      4.91 Push button train start
      4.92 Push button alternator control
5. "In" pulse measurement
   5.1 Percentage measurement
   5.2 Speed measurement
6. Test for "G" relays
7. Test for "F" relays
8. Test of repeater for pulse distortion
9. Test of selector for stepping characteristics
10. Balance test and dial tone modification
    10.1 Balance test circuit
    10.2 Dial test circuit
11. Conclusion

1. *General test equipment application*

In its broadest conception the test equipment is essentially an impulse transmitting "dial" which is adjustable for (a) speed, (b) percent open of a break or make contact. The adjustable dial is further operative to simulate the various following conditions and to provide the various following types of tests:

1. Control keys on a pulse measuring panel permits the adjustment of the pulses to be sent and measures pulses locally generated and/or received from an external point.

2. Generated pulses can be continuous, or form "numbers" having 1 to 5 digits.

3. The above generalities can be variously controlled.

(a) The outgoing "line" can be metallic loop or single wire (ground or battery drive) with a choice of 0, 500 or 1,000 ohms in circuit.

(b) The pause between the digits of a number (interdigital time) is adjustable from about 100 to 1200 milliseconds (national standard is 600 max.).

(c) Digits can be individually sent by operating a push button, for casual progress through a switching system.

(d) Calls arranged to be automatically repeated in cyclic fashion are subject to stoppage if a failure occurs, alternatively the calls may be sent continuously regardless of success ("test" and "non-test" choice): failures, when calls are tested, hold the connection for examination.

(e) Calls can be sent once and held until normally released. A telephone can be associated for talking to answering party.

(f) Single shot pulses can be sent. Combinations of the above, of course, provide a large variety of controls.

5. Continuous pulses serve for studying systems and establishing values for routine maintenance in connection with pulsing and slow relays or switches. It is to be noted that systems can be first studied as to "percent" limits, which can embrace the effects of long/short lines, low/high voltage and other variables, limits may then be stated to facilitate "testing" and "adjusting" to given norms.

6. Adjusting relays by impressing proper percent pulses (speed 10) and noting proper contact output percent, has proven a very rapid and valuable method. Slow relays are tested and adjusted by low/high percentages that just hold the relay or just let it start flipping; in practice, the pulses reach the winding via pulsing relays known to be properly adjusted. Experience indicates that pulsing and slow relays can be given less careful D. C. and gauge adjustments, using pulses to complete the adjustments; this practice also discovers shorted-turns in fast coils not evident with D. C. tests.

7. The set can call from any line to any "test line" number and can continually repeat the call. When so used during busy hours the equipment will operate over the random choice paths encountered by the public—the attendant being free for other duties until stoppage of the set calls him to a trouble. Again, a given portion of a system might be suspected of an intermittent fault and can be routined without the required constant presence of the attendant.

These are only a few of the broader applications of the novel test equipment. Other uses become evident with use of the equipment, many of the uses being so specialized to warrant detailed description herein. Further general applications are described in more detail hereinafter.

2. General description

The pulse testing apparatus of the invention, in preferred embodiment, comprises a portable type unit which is of extremely light weight, and of a comparatively small size, the overall dimensions being approximately 9 in. x 13 in. x 7 in. All circuit control elements are mounted upon four panels (2) of insulating material which, in turn, are mounted upon a metal frame (not shown) and enclosed within a rectangularly-shaped, box-like housing 1.

A number of the tube elements T1–T22 used in the circuit arrangements are also mounted on the top side of the panels to provide ready access to the tube elements for testing and replacement purposes.

A removable cover 3 is used to protect the panel equipment 2 from damage during portage of the unit from place to place, the cover 3 being fixedly positioned with respect to the lower housing when mounted thereon by a group of vertical post members 4 which are disposed at each of the four corners of the panel. Conventional hinge type clasp members 4a attached to the outer walls of the base housing are positioned to engage with cooperating receiving members mounted on the sides of the cover 3.

The control keys and knobs mounted upon the panels 2 are arranged to form a pulse control section 5, a test control section 6, a train control section 7, and a pulse measuring section 8 (Figure 1).

Three "out" terminals 9, 10, 11 located at the upper left hand corner of the panel are arranged for connection with the equipment which is to be tested, the output test pulses as generated by the testing apparatus being transmitted thereover.

A set of "in" terminals 12, 13, 14 located at the upper right hand corner of the panel may be connected to the output side of the equipment under test, and the test impulses as repeated thereby are received over terminals 12, 13 and 14 for test and measurement purposes. A pair of battery terminals 15 and 16 are adapted to be connected to a conventional power supply source in the order of 46–53 volts D. C., such as is conventionally used in telephone exchanges. Extension of the connected power supply connected to the circuits of the test equipment is controlled by a battery key 17. While the test unit in the disclosed embodiment is shown as powered by a 48 volt D. C. supply, it is to be understood that the equipment is readily converted for use with a 110 volt supply.

The primary function of the test equipment is to provide test pulses in the form of calling directory numbers and otherwise at known and controlled rates of speed, the pulses having known and controllable break percentage ratios. A pair of pulse adjustment potentiometers 18 and 19 are provided to respectively effect the variations of the percentage of the make to break ratios of each pulse and the speed of generation by the test equipment, that is, the speed in pulses per second.

A pair of miniature thyratron tubes T21 and T22, which form the heart of the electronic impulse generator are mounted on the topside of the coverplate 2 for convenient accessibility as required. Similarly a drive relay 20 which transmits the electronically generated impulses over the interconnected circuits is mounted on the panel face by means of a plug-in socket connection. The relay 22 is thus readily accessible for adjustment and replacement purposes.

The transmission of the generated impulses, to various points and in various manners is determined by the settings of the several control keys and transmission switches on the control panel as will be more completely set forth hereinafter. Briefly, an out-line key 32 in the pulse control section 5 is operative to control selective connection of the relay impulsing circuit to the out-line terminals and various points in the test equipment. A two position start-stop key 23 is operative in its start position to at times supply energizing potential to initiate the cycling of the test equipment and in its stop position to interrupt the supply of potential thereto. A repeat key 24 optionally controls the equipment to effect repeated transmission of a predetermined digit or digits, a single transmission of that digit or digits or the transmission of a continuous string of pulses. A pulse key 28 controls the nature of the pulse to be transmitted, the pulsing loop controlled by the pulsing relay being normally open when the key 28 is in the break position and normally closed when key 28 is in the make position.

A two position locking hold key 25, a non-locking manual control push button key 26, and a shift key 20 provide means for manually starting successive transmissions of pulses. The functions of these keys will be more thoroughly brought out hereinafter.

Line current control may be effected by means of an out-line ohm key 29 which in its several positions varies the value of resistance to be included in the outgoing test pulsing loop. In-P-wire resistance key 30 alternatively connects high or low resistance in the P-wire circuit and in-P-wire battery key 32 alternatively connects positive or negative battery to the P-wire test conductor.

An important feature of the invention is the manner in which the equipment is operative to transmit groups or trains of digits in repetitive cycles. For the purpose of establishing the value of these digits a plurality of manually operated digit switches 34-38 inclusive are provided. The switches are each operative to ten positions which are identified in sequence by numbers 1-0 inclusive. Each of the switches 34-38 are enabled in the sequence of their arrangement whereby the setting of the first switch determines the nature of the first digit to be transmitted, the second switch determines the nature of the second digit etc. A five point switch 33, designated as the cycle switch, controls and determines the number of digits to be transmitted in each train. Thus to transmit the number 378, the cycle switch is set on digit 3 to indicate the number of digits in the train; the first digit switch 34 is set at position 3; the second digit switch 35 is set at position 7, and third digit switch 36 is set at position 8. The settings on the other two switches are of no consequence for the cycle switch 33 renders them ineffective in the impulse transmission.

A series of thyratron tubes T1 to T22 mounted on the topside of the control panel for ready accessibility are important elements of the various control circuits. Thyratron tubes T11 and T12 for instance are included in an alternator arrangement to the alternated impulses of the generator tubes T21 and T22. Alternator tubes T11 and T12 in turn are effective in controlling sequential striking of thyratron tubes T1-T10 which in their sequence form a basic portion of an electronic counting chain unit.

Briefly, operation of the equipment to transmit a registered number comprises registering of the number on the digit and cycle switches and operation of the start key to the start position. The generator tubes generate impulses of a value commensurate with the setting of control potentiometers 18 and 19, and drives the alternator tubes T11 and T12. As the alternator tubes advance the counting chain to the tube in the counting chain sequence which compares to the position set on the first digit switch 34, the first tube of a group of sequence tubes T18-T20 fires and effects operation of a stop tube T13 to momentarily terminate the operation of the generator pulsing tubes 21 and 22. The length of the pause established is adjustable between .12 and 1.5 seconds and is accomplished by adjustment of the pause potentiometer 40.

During this pause period, the counting chain tubes T1-T10 are extinguished and the generator tubes T21 and T22 and alternator tubes T11 and T12 restore to a given starting point. As the pause period elapses, a start tube T14 fires and the generator pulsing tubes T21 and T22 and once more operate the alternator tubes T11 and T12. The counting chain tubes T1-T10 are responsively advanced to the tube corresponding to the setting on the second digit switch 35, upon which the second sequence chain tube T17 operates the stop tube T13 and extinguishes start tube 14. A pause is once more introduced and the third registered digit is transmitted in a similar manner.

As the third digit is transmitted, cycle switch 33 being set at position 3, becomes effective and the equipment is restored. As will be shown hereinafter, the same generated pulses which operate alternator tubes T11 and T12 are also transmitted as digits and trains by the pulsing relay 22 to the equipment under test. It is apparent that variations in the operation of the equipment occur with movement of the control keys to various positions. For example, if the repeat key 24 is in the repeat position, the equipment under test is reseized and the registered train of digits is repeatedly transmitted in the manner described until stopped by operation of the start stop key 23.

As an aid to accurate adjustment of the testing and tested equipment, a pulse meter 41 which is graduated and calibrated to indicate the rate of receipt of pulses per second as well as the percentage break period of an impulse is mounted upon the control panel face. A measuring key 42 is adjustable to three positions, the key in its upper position connecting the meter 41 and its associated circuits to measure the impulses received over the incoming terminals 12, 13 and 14; the key 42 in its lower position connecting the meter 41 to measure the output pulses of the drive relay 22, and the key 42 is in its normal position completing a portion of the connection between the "out" terminals 9, 10, 11 and the pulse generator equipment.

A two position key 47 adjusts the meter 41 in its one position to read the impulse speed and in its second position to read the make to break ratio of the impulses. A meter key 48 and compensating knob 49 provide suitable compensating means for insuring meter accuracy with occurrence of variations of the value of supply voltage.

Tube test equipment including a tube socket 43, a "fire" button 44 and tube test keys 45 and 46 are mounted on the control panel whereby the various tubes in the arrangement may be tested for strength and sensitivity, the readings being indicated by meter 41.

3. General operation

A more complete digest of the various general functions of the equipment responsive to variation of the settings of the control keys 17, 18 etc., is set forth hereat.

The test unit in its basic embodiment is an automatic dial which is adapted to send impulses at various speeds and which is operative to generate impulses having a controlled variable make to break ratio. The pulses may be generated continuously, or as individual digits, or as trains of digits, each digit being comprised of a predetermined number of impulses of preadjusted characteristics.

3.1 Set adjustment

Adjustment of the equipment prior to testing is accomplished by setting the battery key 17 to the off position; start key 23 to the stop position, and repeat key 24 to the repeat position. Battery terminals 15 and 16 are connected to a source of battery potential in the order of 46–53 volts and battery key 17 is operated to the heat position. As the battery key is operated to the heat position, positive potential is connected to various portions of the operating circuits to place the set in the standby condition. After a period of time has been allowed to elapse to provide a proper interval of time for heating of the filaments the battery key 17 is moved to its "on" position and the equipment is in the standby condition for operation.

Prior to the initiation of the transmission of pulses the meter is checked by depressing the meter key 48 to the check position, adjusting the zero knob 49 so that the meter reads zero percent (full scale), and restoring the meter key to its normal position.

Thereafter the measuring key is operated to the circulator pulse test position to effect the connection of the pulses as generated by the plug-in-drive relay 22 to the meter 41. The break to total percentage ratio of the pulses, as well as the speed adjustment, may now be accomplished in the following manner.

Percentage speed test key 47 is operated to the percentage position and the repeat key 24 is operated to the continuous position. The percentage knob 18 is then adjusted until the meter reads the desired percentage break.

In adjusting the speed of transmission of the pulses, the percentage speed test key 47 is operated to the S position and the adjustment knob 19 is adjusted until the meter 41 reads the desired speed. After these adjustments have been accomplished, the repeat key 24 is returned to the repeat condition and the measuring key 42 is returned to its normal position.

The circulator is conditioned to send pulses of an adjusted value.

3.2 Optional procedure subsequent to pulse adjustment

At this point the adjustment of the various control keys to their various positions permits and effects the simulation of various automatic telephone exchange conditions and various line conditions. For example, the outgoing line which is extended over terminals 9, 10, 11 may be adjusted for operation with an external single wire to positive or negative battery or with a loop circuit to operate by adjustment of key 32 to the B, G or M positions. The resistance of the outpulsing circuit can be set for 0, 500, or 1000 ohms by proper operation of the out-line ohm key 29.

Operation of the pulse key 28 to the break position adjusts the pulsing circuit so that the pulsing circuit will be normally closed upon energization of the equipment. With operation of the pulse key 28 to its "make" position, the make contact of the pulsing relay 22 is in the pulsing circuit and is normally open.

The in-P-wire resistance key 30 is operable to two positions, the low resistance position and the high resistance position. In the low resistance position, a 500 ohm test relay is placed in series with the in-P-wire terminal 14 and is representative of the insertion of a typical cut-off relay as used in conventional telephone exchanges. In the high resistance position the in-P-wire resistance key 30 adds 1000 ohms to the 500 ohm test relay in series with the in-P-wire which extends over terminal 14. The high resistance position is used to reduce possible interference with special cut-off circuits.

The in-P-wire battery key 32 has alternative positive and negative potential settings, it being operative in its first position to connect positive potential to the in-P-wire over terminal 14 and through the test relay of the equipment. In its optional position the key effects the connection of negative potential to the in-P-wire through the test relay of the equipment.

The test relay to be disclosed more fully hereinafter may be optionally effective or ineffective through the operation of the in-P-wire test key 31 to either of its optional positions. In the test position the test relay contacts intervene between the "final" relay 260 and the release relay 150 and as the equipment reaches the destination for which it has been set to transmit, the test relay will permit the release relay's operation. In the event that the equipment under test fails, the test relay will not be operated and the circulator is stopped to indicate failure to the attendant. Additionally, an alarm circuit is energized with the adjustment of the in-P-wire test key 31 to the non-test position, the set operates independent of the test relay.

In use in the field to test a particular type of equipment having known pulsing norms, the foregoing keys are readily moved to their appropriate positions.

The manner of operation of the test equipment after setting of the keys to determine the line pulsing characteristics desired is determined by the control keys 23, 24, 25, 26 etc. Operation of the start key 23 initiates operation of the generator which generates digits or trains of digits as determined by the setting on the digit and cycle switches.

With the repeat key 24 in the repeat position the trains of impulses are repeatedly transmitted, the equipment being operative to test the success of the call in reaching the desired destination if the in-P-wire test key is in the test position, and the equipment being operative to repeat the calls regardless of the success if the in-P-wire test key is in the non-test position.

With the repeat key 24 in the once position the train of digits is transmitted only once, and the equipment is held until released.

By movement of the repeat key 24 to the continuous condition, continuous pulses are transmitted to test the equipment at the particular stage to which it had been driven by last "digit" sent.

In the event that manual control of the equipment is deemed desirable, manual button 26 may be used to accomplish two distinct manual controls:

(1) With key 25 in "hold" position and key 28 in "start tube control" position; key 26 controls manual start of each digit of a given number;

(2) With key 25 in the "normal" position, shift key 28 in the "alternator control" position and power key 17 in the "heat" position, manual key 26 permits observation of the alternator, chain tubes and associated relay performances, the start key 23 is operated in either case.

The operation of the circuit arrangements in accomplishing the transmission of the various types of testing impulses responsive to the operation of the control keys aforementioned becomes more apparent with reference to the following description of the circuit embodiments. For purposes of a most complete illustration, of the manner of operation of the various circuit elements the following description is concerned with the manner in which equipment in an automatic telephone exchange is tested, it being believed that the circuit operations in this test will become apparent therefrom without requiring the inclusion of repetitive material.

4. Circuit description

The various pulse generations and transmissions effected with operation of the aforedescribed control keys to the various positions are accomplished by a circuit arrangement set forth in Figures 1a to 5 inclusive and which basically comprises an impulse generator 50, an alternator 51, a counting chain 52, a set of train switches 53, a cycle switch 56, a sequence chain 54, a start-stop tube arrangement 55 and a set of control relays 159, 160 etc. Adritionally the arrangement includes pulse testing circuit means 57 which is operable to test the impulses as generated by the generator unit 50 or as received over the incoming terminals 12 and 13.

The control keys 17, 18 etc., have been described heretofore and further description at this point is not believed necessary. The contacts of the keys are shown in the position assumed when the keys are in their normally relaxed position.

Pulse generation responsive to proper operation of the control keys is effected by means of a pulse generator which basically comprises a pair of tetrode thyratron tubes 300 and 305, respectively, of the type which is manufactured by the General Electric and marketed as a 5663. An associated RC network 375, which is identified as a speed-percentage network, is adjusted by movement of the speed pulse adjustment potentiometer 19 and the percentage adjustment potentiometer 18.

The plate 301 of the thyratron tube 300 is supplied with positive battery potential in the order of 50 volts over conductor 196 through pulse relay 160 (shunted by resistance 163) when control key 208 is operated "on." Plate 309 of tube 305 is supplied through resistance 380 when the power key is operated to "heat" or "on." The anodes 301 and 309 are interconnected by an anode capacitance 382 which is in the nature of .05 mfd. Anode 301 of the first generator tube is also connected over a capacitance 381 which is in the order of .20 mfds., 10,000 ohm resistor 377 to the lower control grid 307 of the second tube. Plate 309 of the second tube is connected to control grid 303 of the first generator tube 300, over a .20 mfd. capacitor 383 and a 10,000 ohm resistor 373.

The second shield grids 302 and 308 of the generator tubes 300 and 305 are connected to their respective cathode circuits. The cathodes 304 and 306 of the generator thyratrons 300 and 305 are connected to negative battery over a 220 ohm resistor 371 and to positive battery over a 10,000 ohm resistor 379.

The speed-percentage regulating network 375 is connected between negative battery and the control grid circuits of tubes 300 and 305. The percentage control portion of the network comprises a pair of 47,000 ohm resistors 374a and 374c connected in series with a variable resistor 374b which is variable between 0–500,000 ohms. The speed control portion of the network comprises a 5,000 ohm variable resistor 372b which is connected in series with a 620 ohm resistor 372a. Negative battery which is connected to speed control resistance 372a is in turn extended over resistances 372b, 374b, 374a and 374c, 373 and 377 to normally negatively bias the respective grids 303 and 307 of the generator tubes 300 and 305.

The speed-percentage network 375 is also connected to a starting conductor 276, which extends to grid 307 of the second generator tube 305 over a capacitor 378 which is on the order of .005 mfd.

In the normal standby condition with the battery key 17 in the "on" position, positive potential in the order of 1 volt is normally supplied to the cathodes 304 and 306, and positive potential in the order of 50 volts is impressed upon the plates 309 and 301. The tubes are normally negatively biased by the RC network 375 to prevent firing thereof. The output side of generator 50 extends from the plate 301 of the first generator tube 300 over both conductor 196 to a pulsing relay 160 (22) and over resistance 370 and capacitor 386 to an alternator circuit 51. Resistance 370 is in the order of 10,000 ohms and capacitor 392 is in the order of .001 mfd.

The function of the alternator arrangement is to extend the impulses as received over alternative outgoing conductors (labeled "odd" and "even" in Figure 3) to the counting chain arrangement 52. Alternator 51 basically comprises two tetrode thyratron tubes 310 and 135 which are commercially available from General Electric Company as thyratron tubes 5663. Plate 311 of the first alternator tube 310 is adapted to be energized by application of positive potential in the order of 50 volts over load resistance 369, and the plate 319 of the second alternator tube 315 is adapted to be energized by application of positive potential of 50 volts over conductor 273 and load resistance 368. The plates of alternator tubes 310 and 315 are interconnected by an anode capacitor 367, which is in the order of .10 mfd.

The output side of the generator 50 is connected to an alternator input circuit comprising capacitor 386 and resistances 388, 384 and 385. Capacitor 386 is in the order of .001 mfd. and resistances 388 and 385 are in the order of 100,000 ohms. Resistance 384 is in the order of 47,000 ohms. The cathodes of the alternator tubes 310 and 315 are connected to negative battery over a resistance 387 which is in the order of 620 ohms.

Capacitor 392 which is connected in the output circuit of generator 50 serves with resistance 370 as an RC filter which limits the peak voltage of the generated spikes and widens their time bases; it also filters the stray capacitor cross fires which may appear in the circuit.

An auxiliary biasing circuit for the first alternator tube 310 extends over conductor 271 and resistance 389 which may be in the order of 270,000 ohms. The auxiliary starting circuit extending to the grid 313 is in effect a zero start control which insures that the first generated impulse is extended over the odd conductor to the counting chain 52.

The output conductors of the alternator 51 labeled "odd" and "even" respectively extend to a counting chain 52 which comprises a series of ten tetrode thyratron tubes, of the type heretofore described which are arranged in a given predetermined sequence. Each of the thyratron tubes 320 to 365 inclusive have two control grids. One of the control grids of each of the odd numbered tubes in the chain are connected over a differentiating circuit to the odd drive conductor and one of the control grids of each of the even numbered tubes is connected over a differentiating circuit to the even drive conductor. The differentiating circuit for the first tube 320 comprises a capacitor 394, in the order of .005 mfd. and a resistor 396 in the order of 270,000 ohms. The differentiating circuit for the other counting chain tubes comprises a capacitor such as 395 in the order of .005 mfd. and a resistor 397 in the order of 47,000 ohms.

The plates of the tubes in the counting chain sequence are adapted to be energized by a potential of approximately 50 volts as applied over conductor 399 with operation of the reset relay 250. Cathodes, such as 324 etc., of each of the tubes 320, 325, etc., as well as the other control grid 322 of the first counting chain tube 320 are biased by a potential to approximately 6.4 volts with respect to the negative battery terminal, such bias being effected by a plurality of individual resistance networks comprising a resistance such as 393, which is in the order of 47,000 ohms, a resistance such as 394, which is in the order of 4700 ohms, and a resistance, such as 395, which is in the order of 2200 ohms.

The second or other grid such as 328, 333 of each of the remaining counting chain tubes 325, 330, etc., are connected to the individual networks comprising resistances such as 393, 394 and 395 so as to be normally biased at approximately 2.0 volts positive with respect to negative battery terminal.

The second grid 322 of the first counting chain tube 320 is thus normally at zero volts with respect to cathode and the second grids of the second to tenth tubes 325 to 365 are approximately 4.4 volts negative with respect to their cathodes. The first tube is therefore referred to as normally primed for operation. The first spike via the odd lead rendering the first grid 323 sufficiently positive to fire the tube.

A series of ten-position, train switches 415 to 435, inclusive, control the point of advancement of the counting chain. The cathode, such as 324 of each of the counting chain tubes 320 to 365 inclusive are connected to the point on each of the switches which corresponds to its number in the sequence. For example, tube 320 (the first tube in the counting chain) is connected over conductor 409 to point 1 of each of the switches 415 to 435 inclusive, tube 325 (the second tube in the counting chain) is connected over conductor 410 to the second point of each of the switches, etc.

The operating arms of each of the train switches 53 is connected over an associated differentiating network to an associated tube in a sequence chain 54. The differentiating network for tube 440 comprising a capacitor such as 416, which is in the order of .01 mfd. and associated resistance 418 in the order of 270,000 ohms, which is connected to a point source of potential in the order of 2.0 volts. The differentiating network for tubes 445–460 comprise a capacitor such as 421 in the order of .01 mfd. and a resistor such as 423 in the order of 47,000 ohms.

The sequence chain tubes 440 to 460 inclusive comprise a series of five tetrode thyratron tubes of the type heretofore described which are operated in sequence via the associated train switches and their selected counting tubes as successive digit counts are made.

The plates or anodes, such as 441, of the sequence chain tubes 440 to 460 inclusive are arranged to be energized at a potential of approximately 50 volts positive over a common conductor 274. The cathodes such as 444 of each of the sequence chain tubes are biased at approximately 6.4 volts positive by individual associated networks, which comprise a network of series resistances such as 466, 467, 468. The upper grid 442 of the first sequence chain tube 440 is also biased at 6.4 volts.

The lower grid of the first sequence tube 440 is negatively biased by its individual network and resistances 417 and 418. Each of the lower grids such as 448, 453, etc., of the second to fifth sequence tubes are biased through a resistance 469 which is in the order of 1.8 megohms, and which is connected to the resistance network 466, 467, 468 for the prior tube in the sequence. The potential as applied to the lower grid, such as 448 of tubes two to five in the sequence is in the order of 2.0 volts, whereby the grids are made approximately 4.4 volts negative with respect to their cathodes.

The upper grid of the second to fifth tubes in the sequence are at negative battery potential and accordingly approximately 6.4 volts negative with respect to their cathodes.

It is apparent from the foregoing that the first of the sequence tubes 440 is primed to operate with the appearance of a positive pulse upon the lower grid 443, and that as the first tube fires the raising of the potential of the cathode thereof will raise from approximately 6.4 to 40 volts of which about 12.7 volts will appear across the lower grid 448 of the second tube 445 to render the grid 448 of such tube 6.3 v. positive with respect to its cathode. In summary, a primed tube thus has its priming grid 6.3 v. positive and its operating grid at 6.4 negative (each to cathode).

The second tube of the sequence is now primed for operation and as the positive pulse (substantially greater than 6.4 positive) subsequently appears across the second grid 447 of that tube, that tube will strike to prime the third tube 450. Thus each tube in firing primes the succeeding tube in the sequence. It should be observed that the RC combinations of 1.8 megohms and a .01 mfd. condenser to battery delays the rise of potential of the firing grid of tube 445 (for example), by being directed through position 1 of the second train switch (420), tube 445 does not fire at this time. This is required because of the inability to use a definitely separated odd-even drive, with which primed grids can reach the primed value instantly.

The cathodes of each of the sequence chain tubes 440–460 are also connected to a start-stop circuit 55 by a rectifier 471 and a differentiating network comprising a capacitor such as 472 and a resistance 490. Capacitors such as 472 are in the order of .001 mfd. and resistor 490 is in the order of 47,000 ohms.

The start-stop control arrangement 55 comprises a pair of thyratron tetrode tubes 475 and 480 of the type described heretofore which are operative to alternatively control the stopping and starting of the generator unit 50.

The plate 476 of the stop tube 475 is positively energized over resistance 489 by a potential of approximately 50 volts positive and the plate 481 of the start tube 480 is normally arranged to be energized through reset relay 250 over conductor 272 by positive battery of approximately 50 volts positive. The plates 481 and 475 are connected by capacitance member 488 which is in the order of .05 mfd. The cathodes 479 and 484 of tubes 475 and 480 are connected to a negative potential as are the upper control grids 477 and 482.

The lower control grid 483 of start tube 480 is arranged to be biased by a negative potential (derived from a 1.0 mfd. condenser) applied over a resistance 487, which is in the nature of 10,000 ohms, and conductor 279 which extends to the control relay sections and the control key section of the equipment. When start key 23 drops the release relay 150, the 1.0 mfd. condenser slowly charges positively until the firing of start tube 480 effects operation of the reset relay 250 and initiation of the impulse generation. Starting of the equipment may thus be influenced by manual control of the proper combination of control keys to control the start tube 480.

The lower control grid 478 for the stop tube 475 is connected to the cathode output circuit of each of the sequence chain tubes whereby the tube is arranged to strike with firing of any one of the sequence chain tubes. With striking of the stop tube 475, the start tube 480 is rendered non-conductive through the intercoupled plate arrangement including capacitor 488.

Each of the cathode circuits of the sequence chain tubes 440 to 460 are connected to corresponding sequential positions on a five point cycle switch 56, the cycle switch being in turn connected to a "final" relay 260. As the sequence chain advances to the point in the sequence corresponding to the setting on the cycle switch, the circuit is extended to the final relay 260 to terminate the cycle. A time period of delay between the retransmission of the registered number which has been set upon the equipment is effected on use of the equipment in its cyclic capacity to provide suitable operating periods for the equipment under test. The pause period is basically effected through the means of a pause adjustment network including capacitor 264 and resistances 256, 257, 258 and 259, capacitor 264 being in the nature of 1.0 mfd. and resistance 256 in the order of 10,000 ohms, 257 in the order of 2200 ohms, 259 in the order of 100,000 ohms and 258 in the order of 100,000 ohms.

The control of the equipment reset following the transmission of each of the digits of a number is effected through the operation of a final relay 260 and reset relay 250. Test relay 240 is optionally connected via the "in" (P) terminal to the equipment under test and is provided for indicating success of test. A release relay 150 is adapted to effect release of the tested equipment at termination of a cycle (non-test) or with the operation of the test relay 240 (test) following the termination of the cycle.

A pulse testing circuit 57 basically comprises a differentiating circuit and integrating circuit, and a resistance potentiometer 141 which is common to both of these circuits in their arrangement with a meter 41. The testing equipment is arranged to be connected over a meter key 48, a percentage-speed test key 47, and a measuring key 42 to test either the impulses as provided by the test equipment or the impulses as transmitted by the equipment under test.

The in-out conductor 183 from either the test or tested equipment extends over contacts 121 (for speed) or 122 (for percent break) of the test key 47 to a choice of a differentiating circuit (contact 121), or a current limiting circuit (contact 122); common to both is an integrating circuit.

The differentiating circuit tests the rate of arrival of the impulses and basically comprises a resistance element 136 which is in the order of 700 ohms, a capacitor 146, in the order of 3 mfd. connected series with resistor 137, of approximately 100 ohms terminating at a variable potentiometer 141 to negative battery.

The current limiting circuit for percent break tests comprises calibrating rheostat 138 (about 10,000 ohms) and resistor 139 in the order of 10,000 ohms terminating at potentiometer 141.

An integrating circuit is common to the speed differentiating and percent break current limiting circuits as they meet at the variable potentiometer 141, which may have a range of from 0 to 200 ohms. The integrator circuit comprises a rectifier 140 (short circuited during percent break tests), capacitor 142 which may be in the order of 500 mfd. and resistor 145 which may be in the order of 180 ohms.

The detailed operation of the elements in combinations as determined by the settings of the control keys will not be set forth.

4.1 General circuit operation

The manner of operation of the test device in its various applications is believed to be best approached by a disclosure of its use in testing or routining conventional automatic telephone exchange equipment by repeated transmission of a series of digits to an idle line employing a pulse speed of say 10 P. P. S. with a per cent break of 60, conforming with the operating characteristics of the particular equipment under test (representing typical conditions in practice).

As shown in block schematic representation of Figure 5, the testing apparatus may be connected to test the switching equipment of an automatic telephone exchange by the interconnection of driving leads 503 and 504 between the test equipment terminals 9 and 10 and the chosen line in the exchange which enters the input side of the line finder-selector link 500. The connection of the input terminal 14 of the test box to the "P" wire of an idle line to be "called," which is shown as point 234, provides the means for testing success of arrival. Thus, the test equipment effects the repeated transmission of the number 234 over the said calling line 503—504.

To accomplish such transmission, the set is first adjusted to the standby condition and then to generate a series of pulses at the chosen rate of speed and break percentage.

The outline ohm key 29 is then moved to a position which indicates the desired loop resistance (0,500 or 1000 ohms), the "outline key" 32 is moved to the "M" position (metallic loop), and the "pulse key" 28 to the "break pulse" position through contacts 131, the "in P-wire test key" 31 to the test position (assuming usually desired polarity) and the "in P-wire battery key" 32 to "negative to P-wire" position, the cycle switch to position "3" (for 3 digits to be sent), the first digit switch to position 2, the second digit switch to position 3, and the third digit switch to position 4. The pause knob 258 is set for the value of pause desired between digits as determined by measurement at the terminal PT 253a (using separate measuring equipment) or by trial after set starts operating.

The start key 23 is then operated to the start position and the digit 234 is transmitted. The test relay 240 operates as the call is successfully completed, and the release relay 150 restores the equipment to the normal energized condition to effect retransmission of the number 234.

Briefly, the general circuit arrangements are operative in the following manner. When the start key is operated, the start-stop unit 55 operates, the equipment under test is seized and provides pulses in accordance with the settings on the percentage speed adjustment networks 375.

The pulses as generated by the generator unit 50 operate the pulsing relay 160 to transmit the pulses having the characteristics set in the preliminary adjustments over the interconnecting conductors 503 and 504 to the exchange equipment. Pulses are also transmitted to the alternator unit 51 which synchronously generates and delivers pulses alternately to the odd and even conductors extending to the counting chain 52, which responds by advancing one tube in its sequence for each pulse received.

The number of pulses in each train (and accordingly the final point of advancement of the counting chain) is determined by the position of the train switch associated with the digit, that is, for the first digit, the first train switch 415 is effective.

Thus, with train switch 415 set at position two, as the counting chain 52 advances to the second tube, the train switch 415 effects the operation of its associated sequence chain tube 440 of chain 54, which in turn operates the stop tube 475 of the start-stop circuit 55 to terminate operation of the generator equipment 50.

The reset relay 250 operates to stop pulses and prepare for transmission of the succeeding digit after the elapse of a predetermined time period having a duration as determined by the pause adjustment circuit 58.

Successive digits are similarly transmitted until the final digit (4) has been sent. At this time final relay 260 operates, seeking to operate release relay 150 but, due to the "test" condition setup, it must await the operation of test relay 240.

As digits 234 have been sent in succession, the exchange equipment, if successful, extends the call to the idle line 234 and positive battery appears on the "P" wire of line 234 and via the In-P terminal 14 on conductor 172 of the test equipment operating test relay 240. The final relay is now able to operate the release relay, clearing the set and the exchange for the next call. Note that another call cannot start until the exchange has actually cleared (releasing 240), as will be indicated by removal of positive battery from the In (P) test terminal.

In the event of arrival failure, the release relay cannot operate and the set is static, the sequence chain remaining visibly fired. Failure of the exchange to clear also holds the set static, but the sequence chain is extinguished.

The recycling continues until a failure occurs or until the start key 23 is moved to the stop position. Other control keys may also be operated to alter the duration of the test as heretofore and hereinafter described.

4.2 *Normal set condition*

The operation of the circuit elements of the set in testing the telephone exchange equipment in this manner is now set forth in greater detail. The control keys are normally in the positions shown in the view of Figure 1A. "Out" terminals 9 and 10 are connected over conductors 503, 504 to the positive and negative conductors of a vacant line on the switch board of the exchange. The private wire of a station such as 234 is connected by conductor 502 to the input terminal 14 of the testing apparatus.

The plus and minus battery terminals 15 and 16 may be connected to a convenient source of potential, which in the given arrangement should be in the order of 46 to 53 volts (such as is normally available in conventional automatic telephone exchanges).

In preparing the set for operation, the battery key is operated to the "heat" position for approximately a minute to permit ample time for heating of the various tube filaments with a potential of approximately 6.3 volts per tube. It is apparent that with connection of the potential source to terminals 15 and 16, each point marked with negative battery symbol is connected to terminal 16, and with operation of the battery key 208 to the "heat" position positive battery is supplied over closed contacts 209 to all points in the set marked with a ground symbol including the second generator tube 305, the first alternator tube 310 and stop tube 415. As the various tube filaments heat, alternator tube 310 will fire. Frequently generator tube 305 is also rendered conductive, but this is immaterial at this moment.

Also, with movement of the battery key 17 to the "heat" position (and the start key 23 in the stop position) an operating circuit is completed for release relay 150 which extends from positive battery over the stop contacts 213 of the start key 211 and the winding of relay 150 to negative battery. Release relay 150 is operated at this time to open contacts 154 and effect withholding of positive potential from the plates of several of the tubes to open the exchange line 503—504 and to fire the stop tube 475 (by 100,000 ohms positive battery to its grid).

After the elapse of the prementioned heating time, the battery key 17 is moved to the "on" position, whereupon positive potential is supplied to the plate 301 of generator tube 300 over a circuit extending from the positive terminal 15 of the potential source contacts 209, 210, conductor 193, pulse relay 160 and conductor 196.

The test equipment is now in the energized, standby condition.

4.3 *Pulse adjustment*

Prior to use of the equipment in a particular testing application, the metering unit 41 is necessarily adjusted to the zero position, such adjustment being required to compensate for variations in the value of the potential supply.

The battery compensation adjustment in the present arrangement is accomplished by depressing the meter key 48 to the "check" position, and adjusting the zeroing potentiometer 141 so that the meter reads zero percent (full scale). The meter key is then released.

In the event that calibration of the unit is to be made from time to time, an approximately 50 volt battery may be connected to the battery terminals 15 and 16 and a source of grounded 10 P. P. S. pulses is connected to the input lead 183 via terminal IN(—) 13. The percentage-speed key 47 is moved to the speed position and the zero knob 141 is adjusted to the point where the meter 41 reads 10 P. P. S. Then, with the measure check key depressed to the check position, adjustment of the calibration potentiometer 138 for meter 41 to full scale (0% break) is made. The calibration control knob 138 is then locked.

It is to be understood that calibration of the equipment is not required with each use of the test unit, but only at comparatively infrequent occasions and then generally by the manufacturer.

In the transmission of pulses for test purposes, it is necessary that such pulses be transmitted at a predetermined rate of speed and that each pulse comprise a predetermined break to total ratio of duration. In the present equipment the so-called break ratio is indicated in values of percent break on the meter 143. The term "percent break" in the following description is reserved for actual measured open time of the contacts of pulsing relay 160 or any other pulsing contacts under test (whether the contact be a break or a make type contact by construction) and regardless if it is normally open or closed when static.

Primarily, measurement and adjustment of the percentage of break to the total time duration of each of the pulses is accomplished by—

(1) Operating the percentage speed test key 41 to the percentage position,
(2) Operating the repeat key 24 to the continuous position, and
(3) Adjusting the percentage slider 18 associated with the generator 50 until the meter reads the percentage break value desired.

With the adjustment of the control keys to the above positions, positive potential is applied over contacts 218 of the repeat key 24 and conductor 276 to the RC network associated with the generator circuit 50.

4.31 Generator operation

As positive potential in the order of 50 volts is applied to conductor 276 over this circuit, a positive impulse is applied over capacitor 378 to the control grid 307 of the second generator tube 305 to render the grid 307 positive with respect to the cathode 306 which fires the tube 305, it being noted that the cathode 306 is at approximately 3.7 volts in the standby condition of the test equipment compared to about one volt when neither tube was fired.

Additionally, with the appearance of positive potential on conductor 276, a positive potential appears at the slider on resistance 372b of the speed-percentage adjustment network 375, this potential to be varied to meet speed requirements and proportionally distributed via resistor 274b to the grids of tubes 300 and 305 to meet percent break requirements.

As the second generator tube 305 strikes, a potential reduction between the anode 309 and the cathode 306 thereof is effected so that the plate 309 of generator tube 305 is approximately 10 volts positive with respect to the cathode 306 by virtue of tube characteristics.

Also, with the firing of generator tube 305 an alternate path is completed from negative battery over resistance 371, the now conductive tube 305, and resistance 380 to positive battery, whereupon the potential of the cathodes 304 and 306 is raised from one volt positive to approximately 3.7 volts positive, and the potential at plate 309 drops from 50 volts positive to approximately 10 volts positive to cathode.

With the drop of potential at plate 309 in the first instance, the reduction of potential is transmitted through capacitors 383 and 382 to the control grid 303 and the plate 301 respectively of the first generator tube 300 to thereby prevent firing of tube 300, the potential at control grid 303 approaching 39 volts negative at this time and the plate voltage falling to approximately that of plate 309.

The potential of plate 301 of the first generator tube 300 rises quickly to 50 volts positive as condenser 382 charges up, and the sudden reduction in potential at the plate 301 is of too short a duration to permit operation of the pulsing relay 160 at this time.

As the potential applied to the grid 303 rises following striking of tube 305 to overcome the 39 volt negative bias impressed thereupon, and there now being 50 volts positive potential on the plate of generator tube 300, the control grid 303 eventually reaches approximately zero potential with respect to the cathode 304 and tube 300 strikes.

As generator tube 300 strikes, a potential drop between the cathode 304 and anode 301 of the tube occurs, and plate 301 drops to approximately 10 volts positive with respect to the cathode. Additionally, an operating path is completed for the pulsing relay 160 which extends from positive battery over contacts 210 of the battery key 17, battery over contacts 210 of the battery key 17, conductor 193, pulsing relay 160, conductor 196, generator tube 300 and resistance 371 to negative battery. Pulsing relay 160 operates and at its contacts 162 opens positive battery over contacts 114, 161, 137 and 117 to the input lead 103 for the pulse testing equipment.

As the first generator tube 300 fired, the potential at the cathodes 304 and 306 and control grid 307 was in the order of 8 volts positive, and the plate 309 of tube 2 was therefore also raised to approximately 18 volts positive. With the reduction of potential at the plate 301 as the tube 300 fires, a pulse or kick is transmitted over capacitor 382 to the plate 309 of the second generator tube 305 to effect the reduction of the plate voltage thereof to approximately 17 volts negative and thus effect the extinguishment thereof.

The "kick" pulse also appears at the control grid 307 of the second generator tube 305 and the potential at the control grid 303 drops to approximately 25 volts negative. Thus, with firing of tube 300, the impulse relay 160 opens its contact 162 to provide the open period of a generated pulse and generator tube 305 is extinguished.

As the second generator tube 305 is rendered non-conductive the potential of the cathodes 304 and 306 and the control grids 302 and 308 is reduced to approximately 5 volts positive. The potential at the plate 309 of the second generator tube 305 now rises relatively quickly to approximately 50 volts positive. The potential for control grid 307 also rises, but at a less rapid rate as determined by the setting of the arm associated with variable resistance 372b. As the potential at the control grid 307 approaches the value of approximately 5 volts positive, tube 305 fires.

A corresponding reduction of potential between the cathode 306 and anode 309 is effected, and plate 309 drops to approximately 10 volts with respect to cathode. Additionally, the firing of the tube 305 causes the potential of the cathodes 304 and 306 and control grids 302 and 308 to momentarily rise to approximately 8 volts. The potential plate 309 also rises to approximately 18 volts.

The reduction of potential at the plate 309 as the tube 305 is rendered conductive, is transmitted through the capacitors 383 and 382 to the control grid 303 and plate 301 to squelch tube 300.

As the first generator tube 300 is squelched, the energizing circuit for the pulsing relay 160 is interrupted and the pulsing relay 160 releases to initiate the make period of a generated pulse.

Thus, with extension of operating potential to the starting circuit of the generator unit 50, generator tubes 300 and 305, are alternately and cyclically rendered conductive and the repeated operation and release of the pulsing relay 160 is effected.

4.32 Speed-percentage circuit operation

The speed adjustment circuit 375 enables the generator circuit to generate pulses over a range from approximately 3 to 16 pulses per second. The variation of speed of pulse generation is dependent upon the adjustment of the resistance 372b in the network 375; the potential supplied toward the grids (subject to time delay in arrival) can more or less vary the negative bias of both tubes making both tubes less or more quickly reach their firing grid value.

Percentage adjustment enables the generator to be biased (without change of speed) so either tubes and hence relay 160 can favor one direction or the other—10% to 90%.

After the kicking impulse has been received over the capacitor 381 or 383 when one of the tubes is fired the charges in the capacitors 381 or 383 begin to build up to the firing point of their associated grids; as one or the other tube is standing fired, the other tube will reach its firing point after a time determined by the RC value of its grid condenser (381 or 383) and resistance path via its portion at 374b. Variable 374b maintains a time sum total proportioned to each tube.

The speed of pulse given is independent of the break to total ratio inasmuch as the total value of 372b is very low to that of 374b plus the added grid resistors and hence inappreciably effects any RC time constant. Therefore, moving the slider 372b in the direction of the negative battery decreases the number of pulses per second and moving the slider in the direction of the positive battery increases the number of pulses per second without relative change of the firing time ratio, tube to tube.

It is apparent from the foregoing that the tubes 300 and 305 are alternately fired in a predetermined time cycle as effected through the adjustment of the arms 372b and 374b. The first generator tube 300 responsively controls the pulsing of the relay 160 and the transmission of positive potential pulses over resistance 370 to the alternator unit 51.

4.33 Metering

Referring again to the key settings for adjustment purposes, the percentage-speed test key 47 is in the percentage position and the impulses as produced by the pulsing relay 160 are connected to the impulse testing equipment 57 for metering purposes, the input impulse path to the meter 41 extending from positive battery over the contacts 114, contacts 162, contacts 131, 117 to input lead 183 and contacts 122 to the integrating circuit associated with meter 41.

Adjustment of the percentage slider 18 associated with the generator equipment 50 is now effected to obtain the desired break percentage values.

Following adjustment of the generator to provide the desired break percentage value, the speed or rate of receipt of pulses may be adjusted between the limits of 3 to 16 pulses per second by measurement with the percentage-speed test key 47 to the speed position.

The pulse output of the pulse relay 160 as it appears at the input lead 183 is now connected over closed contacts 121 and meter key 48 to the integrating circuit associated with the meter 41 and an indication is provided of the rate of speed of the impulses.

As the respective speed and percentage adjustments have been accomplished, the repeat key 24 is returned to the repeat position and the measuring key 42 to the normal position. The circulator is then in its normal standby condition and is prepared to transmit impulses at a predetermined speed which have predetermined percentage break value.

It is noted that although positive pulses as generated by the generator unit 50 also appear at the input side of the alternator 51 during the adjusting period, the plate 319 of the alternator is not supplied at this time with positive potential and the alternator unit 51 is accordingly non-responsive to the received impulses; this condition is furthered by the locking of grid 313 by positive potential from reset relay contact 251.

4.4 Impulse transmission

Having adjusted the set to provide impulses at a desired rate of speed and percentage break ratio, the equipment may be now further adjusted for transmission of the impulses in predetermined trains to simulate the single or repeated transmission of a directory number by a dial of a telephone instrument.

4.41 Key settings

Assuming that the automatic telephone equipment is sending break pulses to a system having cut-off relays to negative battery of the conventional type and that a 500 ohm metallic loop will simulate somewhat average line conditions, the following key and switch settings are effected in transmitting the directory number 234 to the telephone exchange.

1. Outline key 32 is moved to the "M" position,
2. Outline ohm key 29 is moved to the 500 ohm position,
3. Pulse key 28 is moved to the break pulse position,
4. In P-wire test key 31 is moved to the test position,
5. In P-wire battery key 32 is moved to the negative to P-wire position,
6. Repeat key 24 is moved to the repeat position,
7. The C cycle switch knob 33 is moved to position 3,
8. Train switch know 34 is moved to position 2,
9. Train switch knob 35 is moved to position 3,
10. Train switch knob 36 is moved to position 4,
11. Out plus and minus terminals 9 and 10 are connected to a vacant line of a switchboard to be tested, and
12. In terminal P (14) is connected to the private wire of the called line 234.

The connections between test unit and switchboard for a metallic loop drive as assumed above are shown in Figure 6; the connections for a single wire drive being shown in Figure 7.

With operation of key 23 to the start position, the test equipment now automatically transmits the directory number 234 at the predetermined adjusted rate of speed, the impulses having a break ratio as previously adjusted. The exchange equipment responds to the received impulses and as the call is extended to the line 234 and negative potential is placed on the P-wire thereof, the test equipment prepares for reset and retransmission. In the event that the call is not completed and negative potential is not applied to the P-wire, the test equipment alarm circuit is energized and a positive indication of a faulty condition is effected.

4.42 Initial operations

The operation of the test circuit arrangements in accomplishing such transmission is set forth in detail hereat. With operation of the start key 23 to the start position, positive battery is applied to the plate of the second alternator tube 315 over a circuit extending from positive battery, over contacts 212, conductor 273, and resistance 368 to plate 319 of alternator tube 315. The start key 23 at its contacts 213 also interrupts the holding circuit for the release relay 150 to effect the restoration thereof.

Release relay 150 restores, closing the loop to land the call in the switchboard at contacts 155; at its contacts 151 interrupts a point in a self holding circuit; and at its contacts 152 connects ground to the P wire of the outgoing conductor 182 (which has significance under certain circumstances such as illustrated in Figure 10b). Release relay 150 at its contacts 153 interrupts the application of positive biasing potential to grid 478 of the stop tube 475 in preparation for the extinguishment thereof; and at its contacts 154 effects application of positive potential to the control grid 307 of the second generator tube 305 over a circuit extending from positive battery, contacts 154, conductor 191, the RC circuit comprising resistance 244 in parallel with capacitor 245, contacts 217 of the repeat key, conductor 276, and the RC network comprising resistances 372a, 372b, 374b, 374c, 377 and capacitor 378.

A differentiated pulse is applied by the described components to the control grid 307 of the second generator tube 305 to effect firing of same.

Release relay 150 at its contacts 154 are also effective to connect positive potential over the winding of the reset relay 250, and conductor 272 to plate 481 of the start tube 480. Additionally, release relay 150 at its contacts 154 effects the application of positive potential over conductor 191 and 274 to the plates of each of the tubes in sequence chain 54.

Release relay 150 at its contacts 154 also effects the application of the starting impulse to the start tube 480, the pulse being applied over contacts 154, conductor 191, the RC network comprising resistances 256, 257, 258 and 259 and capacitor 264 as interconnected by contacts 262 and contacts 255; contacts 228, conductor 279, and resistance 487 to the control grid of start tube 480.

It is noted that the starting potential rise is controlled by the pause adjustment network, whereby the period of delay between the time of operation of the start key and the operation of the start tube 480 may be adjusted to various predetermined values, the adjustment being accomplished by movement of the variable resistor 258.

As the positive potential rise is applied to the grid 483 of start tube 480, the tube 480 is rendered conductive and an energizing circuit is completed for reset relay 250, the circuit extending from positive battery over contacts 154, conductor 191, reset relay 250, conductor 272, and the conducting start tube 480 to negative battery.

Stop tube 475 is extinguished as a result of the drop of potential at the plate 476 thereof as the start tube 480 fires and effects transfer, over capacitor 488, of the potential drop appearing at plate 481. Reoperation of the stop tube 475 is prevented in that contacts 153 are open, and positive potential is no longer applied to the control grid 478 of the stop tube.

Reset relay 250 operates, and at its contacts 251 interrupts the source of positive potential for the control grid 313 of the now conductive alternator tube 310.

4.43 Impulse generation

Reset relay 250 at its contacts 252 connects positive potential over conductor 270 to the generator control RC network 375 to effect the application of a positive operating pulse to initiate operation of the generator unit 50 to generate a series of impulses in the manner described heretofore is immediately effected. With tube 305 previously fired, tube 300 thereupon fires.

Reset relay 250 at its contacts 254 connects capacitor 264 to negative battery over resistance 265 to effect the discharge thereof, so that with the subsequent recycling of the equipment, capacitor 264 is in the discharged condition and the desired pause between cyclings of the equipment may be effected.

As the generator tube 300 strikes responsive to application of positive potential to lead 276, a negative impulse is applied over capacitors 381 and 382 squelching tube 305. The firing of tube 300 also completes an operating circuit for the pulsing relay 160 in the manner heretofore described.

Pulsing relay 160 operates and at its contacts 162 initiates transmission of a portion of the first pulse, the open period with pulse key 28 is in the break position as assumed (the closed period of pulse key 28 is in the make position). After a predetermined time period (which is established by the positions of the speed and break control keys 18 and 19) has expired, the control grid 307 is driven positive and generator tube 305 fires. Simultaneously the extinguishment of the first generator tube 300 is effected. The pulse relay 160 releases to terminate the first portion of the first impulse and to initiate the second portion thereof.

It is apparent that the generator tubes 300 and 305 will continue to operate in a cyclic and alternative manner for the period that operating potential is applied to network 375 by the operative reset relay 250. The pulsing relay operates opening the line loop with each striking of generator tube 300 and releases closing the line loop with the extinguishing of tube 300.

Each time that generator tube 300 is extinguished, the potential at its plate 301 rises to approximately 50 volts and a positive impulse is transmitted over the interconnecting circuit elements to the alternator unit 51.

4.44 Alternator operation

Resistance 370 and capacitor 392 form an integrating network which are operative to provide an incoming pulse having a limited peak voltage and a time base which is a compromise for the best operation of the alternator. Also the elements 370 and 392 filter stray capacitive cross fires from the circuit to prevent improper operation of the alternator equipment.

As a result of the operation of the battery key 17 to the heat position, positive potential was supplied to the plate of alternator tube 310 and positive potential through contacts 251 of the reset relay to the control grid 313 fires tube 310. The subsequent operation of the start key 23 to the start position released relay 150 which operated relay 250 removing the biasing potential through contact 251. The operation of the start key also furnished positive potential through resistance 368 to plate 319 of alternator tube 315. Thus the alternator was prepared so that with receipt of the first pulse from the generator tube 315 would be fired.

Thus, as the first impulse, as received from the generator circuit 50, is applied to the network comprising resistance 370 and capacitor 392 as well as capacitor 386 and resistance 384, a differentiated pulse is applied via resistances 385 and 388 to the control grids 317 and 313 of the alternator tubes. In that the first alternator tube 310 is operative at the time, the incoming impulse merely renders the control grid 313 for tube 310 more positive. The same positive impulse appears at control grid 317 to drive the grid positive and cause the second tube 315 to fire.

As second alternator tube 315 fires, the potential of cathodes 314 and 316 is slightly raised and the potential at plate 319 of alternator 315 is greatly reduced, the reduction in potential being transmitted through the interconnecting plate capacitance 367 to the plate of the first alternator tube 310 to effect the squelching thereof. Two factors then inhibit tube 1; the reduction in potential of the plate and the slight elevation in potential of the cathode.

Thus, the zero point of operation for the alternator prior to receipt of the first impulse from the generator is with the first alternate tube 310 conductive. With receipt of the first impulse, the second alternator tube 315 fires and the first alternator tube 310 is squelched.

As the first alternator tube 310 is squelched, an increased potential (in the value of 50 volts) appears at the plate 311 of the alternator tube 310 and a positive impulse is transmitted over the "odd" drive lead to the odd numbered tubes of the counting chain; that is, tubes 1, 3, 5, 7 and 9, and operation of the counting chain is initiated in a manner to be shortly more fully described.

With receipt of the second impulse from the generator circuit 50, the control grid 313 of the first alternator tube 310 is driven positive to effect the striking thereof, and the control grid 317 of the operated alternator tube is merely driven more positive.

As the first alternator tube 310 fires, the potential of the plate 311 is reduced, and the potential reduction is transmitted through the interconnected capacitor 367 to the plate 319 of the second alternator tube 315 to effect the extinguishment thereof.

The potential at plate 319 of second alternator tube 315 quickly rises to approximately 50 volts as the tube 315 is squelched, the rise in potential being transmitted to the "even" drive conductor and the control grids of the even numbered tubes in the counting chain sequence, that is, tubes 2, 4, 6, 8 and 10.

Summarily, at this point, operation of the start key 23 has effected energization of the generator unit 50 to produce pulses of controlled characteristics. Additionally, intermittent positive pulses are being transmitted over an interconnecting circuit to the alternator arrangement 51 which in turn effects application of positive pulses alternately to the odd and even drive conductors extending to the counting chain. This operation continues for the period that operating potential is applied to conductor 270 or 276.

4.45 Counting chain operation

The first alternator tube 310 is squelched as the first impulse is received as before mentioned, and the positive pulse appears upon the odd drive lead. The first counting chain tube 320 strikes but the remaining tubes connected to the odd drive conductor remain inoperative.

Selective operation of the first counting chain tube 320 of the sequence is effected by reason of the primed condition of this tube, and the non-primed condition of the remaining tubes in the counting chain. With reference to the counting chain tubes, it is noted that each tube of the chain has two control grids. Both of the grids of the second to tenth tubes in the chain are normally negatively biased with respect to cathode and only the upper grid of the first tube is normally at zero potential with respect to the cathode (the lower grid of this tube being negatively biased with respect to the cathode). Thus as the first positive impulse from the alternator appears on the odd conductor, and one grid of each of the odd tubes is driven positive, only the first tube will fire.

As the first tube fires, it is operative to "prime" the second tube of the chain by rendering the lower grid of the second tube decidedly positive with respect to the cathode. The second impulse from the alternator is applied to the even conductor and the upper grid of each of the even tubes is driven positive. Since only the second tube is primed however, it is the only even numbered tube to fire. The priming and firing of the tubes in sequence continues as the pulses are received from the alternator over the odd and even drive circuits.

In detail, the plates such as 321, of each of the counting chain tubes are normally supplied with positive potential of approximately 50 volts as reset relay 250 is operated. Likewise, the cathodes such as 324 of each of the counting chain tubes are connected to a source of potential by means of an associated resistance network (which comprise resistances such as 393a, 394a and 395a) and are normally energized by a potential of 6.4 volts with respect to the negative battery terminal. The upper control grid 322 of tube 320 is also biased at 6.4 volts whereas the upper control grids such as 327 of each of the other tubes are biased at zero volts.

The lower grid of each of the second to tenth tubes such as 328, 333, etc., are biased at approximately 2.0 volts positive with respect to the negative battery terminal. Thus the lower grid, such as 328, 333, etc., of each of the second to tenth tubes is normally approximately 4.4 volts negative with respect to the cathode.

Since the grid 322 of the first tube of the counting chain is normally biased at 6.4 volts, as the first positive impulse (which is in the order of 12–14 volts) is applied over capacitor 394 to lower grid 323 of tube 320, driving said grid positive with respect to cathode 324. In that the upper grid 322 is biased with 6.4 volts and is at zero bias with respect to cathode, the tube 320 strikes. Although the same positive impulse is applied over capacitors 395 to the control grids 332, 342, etc., of the odd numbered tubes in the counting chain, these tubes will not be rendered conductive by reason of the fact that the lower control grids 333, 343, etc., are negatively biased with respect to their cathodes 334, 344, etc.

As the first counting chain tube 320 is rendered conductive, the potential of its cathode is raised to approximately 40 volts positive, with respect to negative battery terminal. With the rise of potential at the cathode 324, a rise of the potential applied to grid 328 is also immediately effected, the voltage rising from a value of two volts, as previously applied, to approximately thirteen volts. The lower grid 328 of the second tube is now approximately six volts positive with respect to its cathode 329, and the tube is "primed" for operation, grid 327 being at zero potential, and, therefore, 6.4 volts negative with respect to cathode. Tube 325 is thus prevented from firing at this time.

As the second impulse of the digit is generated and the positive voltage impulse, in the order of 12 to 14 volts now appears on the even drive conductor, a differentiated pulse is applied by the RC network, comprising capacitor 395 and resistance 397, to the upper grid 327 of the second tube 325 to drive the grid positive with respect to cathode. Inasmuch as the lower grid 328 was rendered positive with respect to cathode as the first sequence tube 320 fired, both control grids 327 and 328 are positive and the tube 325 will now fire.

As the positive pulses appear alternately on the odd and even drive conductors the tubes of the counting chain will fire in sequence.

4.46 Sequence chain operation

In the present example, it has been assumed that the directory number 234 is to be transmitted and accordingly train switches 415, 420 and 425 will be set on positions 2, 3, and 4 respectively. Cycle switch 56 is set on point 3 to indicate that a directory of three digits is to be sent at this time.

As the first tube 320 in the counting chain fires on receipt of the first impulse from the alternator 51, a sudden elevation in potential to a value of approximately 40 volts is effected at the cathode 324 thereof and a positive impulse is transmitted over conductor 400 to the first position on each of the train switches 415, 420, 425, 430 and 435 respectively.

The sequence chain 54 comprises a series of five tubes each of which is associated with an individual one of the train switches 53. Thus train switch 415 and sequence tube 440 are associated elements.

The tubes each have two control grids, and in a manner somewhat similar to that of the counting chain, the tubes are arranged in a given sequence with only the first tube primed for operation.

Specifically, one grid (448, 483 etc.,) of the second to fifth tubes 445 to 460 is normally biased at approximately 2.0 volts as is also grid 443 of tube 440. Grid 442 of the first tube 440 is at cathode potential 6.4 volts. The second control grids 447, 452, etc., of tubes 445-460 are at approximately 2.0 volts potential with respect to the cathodes. The cathodes of all five tubes are biased at approximately 6.4 volts and the plates are at approximately 50 volts positive potential.

A second control grid of each sequence chain tube is connected to the variable arm of its associated train switch. Since the first tube alone of the sequence chain has its one control grid normally at zero bias, driving of its second grid positive will strike the first tube.

Inasmuch as the train switch 415, associated with the first sequence tube 440, is set at position two, the appearance of positive potential on conductor 400 and point one of train switch 415, as the first counting chain tube fires, will be ineffective. Should any of the second to fifth train switches be set in digit one, the positive pulse would be applied over the closed position of that switch to the lower grid of the associated sequence chain tube. Since only the first sequence tube is "primed" at this time however, the application of potential to any but the lower grid of the first tube will be ineffective at this time.

As the succeeding impulse is received and the second tube 325 of the counting chain strikes, the potential of cathode 329 thereof is raised to approximately 40 volts and the application of a positive potential impulse over conductor 401 to the second point of each of the train switches is effected.

In that train switch 415 is set at the second position (in the transmission of number 234) the positive impulse appearing on conductor 401 is transmitted over the second point of the first train switch 415 to the differentiating network comprising capacitor 416, and resistances 418 and 468 to negative battery. A differentiated pulse is applied thereby over resistance 417 to the first control grid 443 of the "primed" tube 440 of the sequence chain. (The impulse on conductor 401 also appears on position 2 of other train switches which may be set at such position, but since only the first tube of the sequence chain is presently primed, the other applications are ineffective.)

Sequence tube 440 fires and causes the potential of its cathode 444 to rise from approximately 6.4 volts to approximately 40 volts positive with respect to negative battery terminal.

With the rise of potential at the cathode 444, the lower control grid 448 of the second tube 445 of the sequence chain 54 is raised to approximately 13 volts positive and thereby biased positive with respect to the cathode which is at approximately 6.4 volts. It is noted that the RC combination comprising the 1.8 megohm resistor 469 and the .01 capacitor 470 introduces a time delay in the rise of potential as applied to the grid 448 of the tube 445, so that in the event that the arm of switch 420 is also set at the second point of the switch, the impulse transmitted by the second chain tube 325 will not effect the striking of the second sequence tube 445. It is noted that a similar network is inserted between each of the tubes in the sequence for this purpose.

The second tube 445 of the sequence chain is now in the primed condition. The third, fourth and fifth tubes of the sequence chain are now in the non-primed condition. The second tube 445 is maintained inoperative at this time by control grid 447 which is negatively biased with respect to cathode 449 over resistance 423 and 422. The second sequence tube 445 is thus prepared to fire as the subsequent advancement of the counting chain occurs to effect transmission of the second digit of the directory number 234.

Similarly, as the second digit of the number is transmitted the third sequence tube 450 is "primed" for operation.

As the first sequence tube 440 fired and the cathode potential thereat rose to approximately 40 volts, a positive pulse was applied over a rectifier 471 and an associated RC network including capacitor 472 and resistance 490 to the control grid of stop tube 475 for the purpose of terminating the generation of impulses for the first digit. That is, the train switch 415 having been disposed at the second point of the switch to indicate that two impulses were to be sent as the first digit, the stop tube 475 must be fired to stop the generator unit 50 as the counting chain advances to the second tube 325.

4.5 Start stop circuit

As previously described, the start tube 480 was fired as the start key 23 was operated and the stop tube 475 was squelched by reason of the interconnected anodes 476 and 481. As the counting chain 52 now advances to the second tube 325 (the position now indicated by the preset train switch 415), the first sequence tube 440 strikes and the differentiated pulse as applied thereby to the control grid 478 of the stop tube 475 renders the grid positive with respect to cathode 479 and causes the stop tube 475 to fire.

As the stop tube 475 is rendered conductive, the potential of plate 476 is suddenly reduced and the potential drop is transmitted through the interconnecting capacitance 488 to the plate 481 of the start tube 480 to effect the squelching thereof. As the start tube 480 is extinguished the operating circuit for the reset relay 250 is interrupted and the restoration thereof is effected.

Reset relay 250 restores and at its contacts 252 interrupts the application of positive potential to the speed-percentage network 375 associated with the generator unit 50 to terminate the generation of pulses thereby. Reset relay 250 is effective at its contacts 251 to re-apply positive potential to the lower control grid 313 of the first alternator tube 310 to effect resetting of the alternator to the zero start position in the manner heretofore described, and at its contacts 253b, reset relay 250 interrupts the application of positive potential to the plates of the counting chain tubes 320 to 365 inclusive to extinguish each of the counting chain tubes and thereby recondition the chain for receipt of a subsequent series of impulses.

Reset relay 250 at its contacts 255 effects the application of a rising potential to control grid 483 of the start tube 480 and as the rising potential reaches approximately seven volts positive, the start tube 480 is again rendered conductive. The time required for the positive potential to reach such value will be determined by the setting of the potentiometer 258, this potentiometer being operative to determine the length of the pause between the digits as generated.

As the start tube 480 strikes, an operating circuit is recompleted for the reset relay 250 which extends from positive battery over contacts 154, conductor 191, winding of relay 250, conductor 272, and the now conductive tube 480 to negative battery.

The start tube 480 in becoming conductive effects a large reduction of potential at its plate 481 which is transmitted through the interconnecting capacitance 488 to the plate 476 of the first tube 475 to effect the squelching thereof.

With the reoperation of reset relay 250, the recycling of the generator 50, alternator 51, and counting chain 52 is effected in the manner described and the transmission of the second digit of the directory number is effected.

In the given example, the second train switch 420 has been set at the third point of the ten point switch and the generator unit 50 is therefore operated to transmit three impulses. The pulsing relay 160 transmits the pulses to the equipment under test and the alternator 51 advances the counting chain to the third tube 330 in the sequence. As the third tube strikes, a positive impulse is transmitted over closed point three of train switch 420 to the second tube 445 of the sequence chain 54. Sequence tube 445 fires and causes the stop tube 475 to fire and effect release of the reset relay 250, as well as squelching of start tube 480. Release relay 250 restores to interrupt the supply of operating potential to the generator and thereby terminate impulse generation of the second digit at number three.

A predetermined time period is introduced prior to the initiation of the transmission of the third pulse by the pause adjustment RC network. During this time period, the counting chain 52 resets and the alternator circuit 51 is adjusted to a given zero starting point. After the given time delay the start tube 480 is reoperated to effect re-energization of the reset relay 250 and the generator unit 50. Transmission of the third digit is now effected.

In the generation and transmission of the impulses by the generator unit 50, the alternator 51 advances the counting chain to the fourth tube 335, which in turn effects transmission of a positive pulse to the fourth position of switch 425 to the third sequence tube 450. The firing of the third sequence chain tube 450 is accomplished thereby to effect the firing of the stop tube 475. Start tube 480 is squelched as the stop tube 475 fires to cause reset relay 250 to interrupt the supply of potential to the generator unit 50 and thus terminate the impulse generation. The counting chain 52 and alternator 51 are also reset to the zero start point as the reset relay 250 operates.

Inasmuch as the digit 234 has now been transmitted, the exchange equipment, if in operative condition, will have switched the call through to the desired subscriber line 234. The testing equipment is therefore desirably restored to its normal standby condition and prepared to effect a second transmission of the directory number 234.

Such reset is initiated by the cycle switch 56, which in its adjustment to one of the five switch points, determines the number of digits to be transmitted in a given operation.

For example, the number 234 containing three digits, the cycle switch 56 was adjusted, prior to operation of the test equipment, to the third point of the cycle switch. As the third sequence tube 450 fires following transmission of the last digit "four" to thus terminate the transmission of the third digit impulses, the positive impulse which appears at the cathode 454 of the third sequence tube 450 is also transmitted over the third point of the cycle switch 56, conductor 277, and the winding of the final relay 260.

Final relay 260 operates and at its contacts 261 connects capacitor 264 of the RC pulse adjustment network to negative battery over a circuit extending over contacts 255 and 261, and resistance 295. Discharge of capacitor 264 is effected thereby.

Final relay 260 at its contacts 263 also prepares a circuit for the release relay 150, the circuit extending from negative battery over the winding of the release relay 150, conductor 195, contacts 242 of the test relay 240, contacts 216 of the repeat key 24 in the repeat condition, contacts 263 and contacts 212 of the start key 23 to positive battery.

It is apparent that if the test relay 240 is in the inoperative position, its contacts 242 will not be closed and the operating circuit for the release relay 150 will not be completed. However, if the test relay 240 is operated the circuit to the release relay will be completed and the release of the test equipment will be effected.

The operated or non-operated condition of the test relay 240 (with the keys in the positions set forth for this test) is dependent upon the success or failure of the equipment under test to extend the call to subscriber line 234. That is, if the equipment under test successfully seizes the called line 234, positive potential will be connected to the P wire of line 234 in conventional manner. Since the "in" terminal PI72 of the test equipment is connected to the P wire of subscriber line 234, as the call is successfully extended to line 234, positive potential is extended over conductor 502 (see Fig. 6), terminal 14, conductor 172, resistance 233, test relay 240, contacts 207 of the P wire battery key 32A and resistance 232 to negative battery.

If the apparatus is unsuccessful, absence of positive potential on this circuit to the test relay 240 will indicate such failure and the test relay 240 will be inoperative and cycling of the equipment is terminated.

Also, if the test relay 240 is inoperative by reason of the failure of the equipment under test when the final relay 260 operates following transmission of the final digit of the registered number 234, an energizing circuit for the alarm equipment is completed to notify the attendant of the faulty condition, the alarm energizing circuit extending from positive battery over contacts 212 of start key 23, contacts 263, 216, 243 and 203 to the alarm circuit equipment.

The test equipment automatically terminates cycling until the fault is located and positive potential appears on the P wire of subscriber 234. The test equipment may, of course, be operated to continue cycling if so desired by manipulation of other of the control keys.

If the equipment successfully extends the call to the called line in the first instance, test relay 240 will operate, which operation in conjunction with the operation of the final relay 260 completes the operating circuit for the release relay 150, the circuit extending from negative battery over the winding of relay 150, conductor 195, contacts 242, contacts 216 of the repeat key 24, contacts 263, contacts 212 of the start key 23 to positive battery.

Release relay 150 operates and at its contacts 151 completes a self holding circuit over contacts 241 of the test relay 240, to effect the resetting of the equipment for a subsequent cycle.

Specifically, release relay 150 operates and at its contacts 154 interrupts the application of positive potential over conductors 191 and 274 to the plates of the sequence chain tubes 240 to 260 inclusive to thereby extinguish the tubes of the sequence chain 54 and prepare the first tube 440 for reoperation as the next cycle is effected. Release relay 150 at its contacts 153 applies positive potential over conductor 275 to the firing grid 478 of the stop tube 475 to maintain the stop tube 475 in the conductive stage for a further predetermined period which is commensurate with the period release relay 150 is maintained operative and the setting of the pause adjustment equipment 58. Release relay 150 is also effective at its contacts 155 to interrupt the line loop to the switchboard which extends over conductors 180 and 181 to effect the release of the seized equipment in the conventional manner.

Release of the seized switch equipment effects removal of positive potential from the P wire of the called line 234 which in turn effects the release of the test relay 240. As test relay 240 restores it is effective at contacts 241 to control release of the release relay 150, which at its contacts 155 recompletes the line loop and initiates reseizure of the equipment to be tested.

In that the equipment under test requires a predetermined time period to land a call within the switchboard equipment, a predetermined time delay period must be introduced prior to the retransmission of the directory call number 234. Such time delay is introduced by the capacitor 157 and resistance 156 as connected to negative battery across the winding of release relay 150. The time delay introduced will prove sufficient for most types of conventional equipment, but in the event that a time delay of greater latitude is desired, it may be accomplished by insertion of an RC control tube circuit of the type used in accomplishing the pause adjustment which is effected between the interdigital pause period. The landing delay, that is the delay accomplished by the capacitor-resistance network 156, 157 is precedent and additive to the interdigital pause time which is effected by pause adjustment control circuit 58, so that the minimum landing time will be that of any pause time established by circuit 58.

As the release relay 150 restores after the predetermined time period has expired, the closed contacts 152, 154 and 155 initiate a second cycle of the test unit and the retransmission of number 234. Cycling of the test equipment continues in this manner until the stop key 23 is moved to the stop position. The equipment is of course also stopped by operating others of the control keys.

On switchboards arranged for automatic link rotation, each reclosing of the line loop by the test equipment causes the automatic link rotation circuit to operate and land the call. Thus, if all links are idle at the time of testing, the called line would be successfully routed through all of the links. As the switchboard becomes busier, such procedure effects a thorough routining of the random choice paths encountered by the public.

The circulator continues to "routine" until a fault or failure is encountered in the line equipment at which time a suitable alarm is provided.

The aforegoing description set forth heretofore is concerned with the operation of the equipment responsive to operation of the control keys to the position described, the end result being the cyclic seizure of the equipment to be tested and transmission of directory number 234 thereto for test purposes. It is apparent that the operation of the circulator for the extension of other directory numbers comprising a larger number of digits is similarly effected and an analogous operation of the equipment will occur.

It might be noted that the conjunctive action of the arrival signal and the final digit signal (within the set) permits reception of an arrival signal before the end of the last digit, in fact, any time after a call has landed and before pulses start, thus enabling setting up of special tests, such as letting a first selector off-normal or calling line private control, by its disappearance, the start of another call.

4.6 Cycling without testing

In given instances, it may be desirable to test a switch or several switches of an exchange separately without reference to the ability of the equipment to extend calls through the complete exchange. In such event, the test relay 240 may be bypassed and the following adjustment of the keys on the board is appropriate.

The in-P-wire test key 31 is moved to the non-test position, whereby contacts 203 are opened to disconnect the alarm equipment of the test unit, and contacts 204 are closed to prepare a direct circuit to the release relay 150. Repeat key 24 is moved to the repeat position to close contacts 216. Thus with operation of the final relay 260 responsive to the transmission of the last digit of a registered directory number, final relay 260 is effective at its contacts to immediately complete the prepared operating circuit for the release relay 150 without waiting for the results of the test of the exchange equipment. The operating circuit extends from negative battery over the winding of relay 150, conductor 195, contacts 204 of the in-P-wire test key 31, contacts 243 of the now non-operated test relay 240, contacts 216 of the repeat key, contacts 263 of relay 260 and contacts 212 of the start key 23 to positive battery.

The release relay 150 operates and at its contacts 155 opens the line loop to the equipment being tested to effect the release thereof. The release relay 150 is also operative at its contacts 154, in the manner heretofore described, to effect the release of the sequence chain 54 which in turn effects release of the final relay 260 and, in turn, the release relay 150. The restoration of release relay 150 effects reclosure of the line loop and accomplishes reseizure of the equipment to be tested for recycling purposes.

4.7 Single cycle operation

In the testing of certain types of switch equipment the transmission of a single train of digits is frequently advantageous and the test unit of the disclosure is so operative. For such use the repeat key 24 is moved to the position identified by the designation "Once" in which position contacts 217 are closed, and the repeat control contacts 216 are opened to prevent initiation of a second cycle by the final relay as the first cycle is completed.

The transmission of the registered number (for example, number 234) is effected in the manner heretofore described, but as the final relay 260 operates, the circuit for the release relay 150 is interrupted at the open repeat contacts 216 of the repeat key 24. Accordingly, the release relay 150 will be maintained inoperative, and the release thereof as well as the release of the equipment is prevented until the start key 23 is operated to the stop position.

With the operation of start key 23 to the stop position, positive potential is connected over contacts 213 and conductor 195 to the winding of the release relay 150 which operates and restores the set to normal.

A further single cycle of the test equipment is effected with movement of the start key 23 to the start position.

4.8 Continuous pulsing to a seized stage

In certain tests it may be desirable to send all or part of a called number to drive external equipment to a certain destination or to a certain stage of the equipment and upon reaching that stage to send continuous pulses to test the switch so seized. According to the invention the equipment is operative by proper adjustment of the control keys to transmit the portion of the number required to seize the desired stage and thereafter to send continuous pulses to test that stage. Further, the continuous pulse transmission to that stage may be safely stopped at will, the equipment being in such phase at all times as to maintain the connection to the stage under test. Thus, the transmission of continuous pulses to a stage may be started and stopped as often as desired while holding the call to the tested state.

In such manner of use, the equipment is started in the normal manner with the desired stage registered on the digit switches and cycle switch. Repeat key 24 is moved to the "once" position and the start key is then operated. As the equipment reaches the desired stage the repeat key 215 may be operated to the continuous position and the movement thereof between the repeat and continuous position may be made as often as the transmission of continuous pulses thereto is desirably effected. Since the start key 23 is in the start position when the key is moved from the "once" position to the continuous position, a loop is prepared to receive the continuous pulses.

It is important that in the shift back from the "continuous" to the "once" position upon termination of the continuous pulsing, the last pulse shall be so phased as to leave the loop closed to hold the call. Such circuit condition is achieved by means of a capacitor 245 which is charged upon closure of the continuous break contacts 217 of the repeat key 24. As the contacts 217 of the repeat key 24 are reclosed upon termination of the continuous pulsing, a pulse is applied to the grid 307 of the second generator tube 305 over capacitor 378 and conductor 276. Thus, even if the second generator tube is not fired as the last pulse is transmitted the pulse provided by capacitor 245 will cause generator tube 305 to fire squelching tube 300 which restores pulse relay 160, closuring the loop at contacts 155.

Release from the stage as the test pulsing is complete may be accomplished by the operation of any of a number of the test equipment keys.

4.9 Manually controlled pulsing
4.91 Push button train start

Under certain circumstances it may be advantageous to be able to manually initiate the pulsing of each digit, such pulsing being accomplished in the manner now set forth.

Repeat key 24 may be in either the "repeat" or "once" condition. Cycle switch 56 is adjusted to the number which corresponds to the number of digits to be included in the train to be transmitted and the train switches 415, 420, etc., are adjusted to express the numerical value of each of the digits in the order of their transmission.

Hold key 25 is moved to the hold position to effect the closure of contacts 229, and 227, and the shift key 28 is pulled outwardly to the "start tube control" position whereby contacts 221 are closed. Start key 23 is pulled outwardly to the start position and contacts 212 are closed. Finally the manual control push button 26 is operated to effect the closure of contacts 224 and the opening of contacts 225.

With each depression of the manual control push button 26, a single digit of the number which has been set up on the train switches is transmitted, the length of the period which the manual control push button 223 is operated being independent and immaterial as to the transmission of the digit.

In detail, with operation of the hold key 25 to close the contacts 227 and 229, capacitor 264 is shunted to negative battery. Control of the start tube 480 is transferred from the time delay automatic start circuit previously described to the manual control push button 26. Specifically, with the closing of contacts 227 by operation of the hold key 25 a negative bias is applied to the control grid 483 of the start tube 480 to maintain same in the extinguished condition, the circuit extending over resistance 487, conductor 279, contacts 227 and resistance 231 to negative battery. At contacts 228 the start tube is disconnected from the time delay automatic start circuit and at contacts 227 is prepared for actuation by the manual control push button 26.

With the opening of contacts 213 by operation of start key 23 to the start position, the release relay 150 restores and at its contacts 154 completes a point in the circuit which normally causes the start tube to fire. However, contacts 228 of the operated hold key are now open and the aforedescribed starting circuit is interrupted at that point.

With the first operation of the manual control push button 26 to close contacts 224, discharge of the normally charged capacitor 230 is effected over closed contacts 224 and 221, conductor 279 and resistance 487 to the control grid 483 of the start tube 480. The positive pulse drives control grid 483 positive to render start tube 480 conductive.

As the start tube 480 fires, the stop tube 475 is squelched and energization of the generator 50 and alternator 51 is effected to advance the counting chain 52 to the point which corresponds to the setting of the first train switch 415. Assuming the first train switch 415 is set at digit 2, as the chain advances to the second tube 325, the first sequence chain tube 440 fires and energization of the stop tube 475 is effected which in turn squelches the start tube 480. Operation of the generator unit 50 is thereby temporarily terminated. Inasmuch as the hold key 25 is in the hold position contacts 228 are opened and the starting circuit normally controlled by the reset relay 250 is opened at contacts 228 to prevent the automatic transmission of the next registered digit in the manner heretofore described.

Also negative potential is applied over resistance 231 and contacts 227, conductor 279, and resistance 487 to the grid of the start tube 480 which further guards reoperation of the start tube. Should the manual control push button 26 still be in the closed position as transmission of the first digit is completed, no further operation of the start tube 480 will result in that the capacitor 230 has not been recharged since its discharge which effected the transmission of the first digit.

With the outward movement of the manual control push button 26, contacts 225 will be closed and an obvious recharging circuit for the capacitor 230 will be completed. As the manual control push button 26 is subsequently reclosed, contacts 224 effect the completion of the discharge circuit for the capacitor 230 and the reoperation of the start tube 480 to accomplish the transmission of the second recorded digit in the manner heretofore described.

In this manner the individual transmission of each of the registered digits may be manually controlled at will. When the number of digits indicated by the cycle switch 56 has been transmitted, an operating circuit is completed over the cycle switch 56 to the final relay 260. The final relay 260 operates in the manner heretofore described to operate the release relay and recondition the set for a subsequent transmission of the first digit of the desired number with the reoperation of the manual control push button 26.

4.92 Push button alternator control

If desired the generator unit 50 may be bypassed and individual pulses transmitted to the alternator unit 51 through manual operation of a key member 26. With the set in the normal standby condition described, a so-called manual pulsing or "button test" of the alternator, counting chain, sequence chain, and start-stop circuit is performed in the following manner:

a. Battery key 17 is operated to the heat position to open contacts 210.

b. Shift key 28 is moved to the alternator control position to thereby close contacts 222 and open contacts 221.

c. The setting of the train switches and the cycle switches is unimportant to the tests to be described, but for comprehensive use of the equipment the cycle switch is desirably set upon numeral 5 and the train switches one in the zero position, thus allowing each of the switches to proceed to their zenith position without interference to the test.

d. Start key 23 is moved to the start position thereby closing contacts 212 and opening contacts 213.

e. Manual control push button 26 is depressed to effect the transmission of the first pulse to the alternator equipment.

With the operation of the start key 23 to the start position, contacts 213 are opened to effect the restoration of the release relay 150 in the manner heretofore described, the firing of the start tube 480, and the application of positive potential to the plates of the sequence tubes 440, 445, etc. Reset relay 250 operates, the stop tube 475 is squelched and positive potential is supplied to the speed-percentage network 375 of the generator unit 50.

However, the battery key 17 being in the heat position, contacts 210 will be opened, and positive potential will not be supplied to plate 301 of the first generator tube 300. Accordingly, the generator will be disabled and will not respond to the application of the positive potential to the speed percentage network 375.

Reset relay 250 in its operation also effects the discharge of capacitor 264 over resistance 265 so that the capacitor 264 will operate from the proper zero point to control the rise of potential as applied to the grid 483 of the start tube 480 upon the transmission of the next digit.

With operation of the manual control push button 26, capacitor 230 (which is charged during the normally closed period of contacts 225) is discharged over contacts 224, alternator control contact 222, conductor 279, and resistance 390 to the common conductor which extends between the firing grids 313 and 317 of the alternator tubes. As previously described, the first alternator tube 310 will be in the fired condition as a result of the biasing potential imposed thereupon by the normally closed contacts 251 of the reset relay. The incoming pulse over the common conductor 278 as applied to the resistances 385 and 384 now effects the firing of the second alternator tube 315 and the resultant squelching of the first alternator tube 310.

As the first alternator tube 310 is extinguished an operating pulse is transmitted over the odd conductor to the first counting chain tube 320 to render same conductive. The first alternator tube 310 remains extinguished and the second alternator tube 315 remains energized.

Upon release of the manual control push button 26, capacitor 230 recharges over closed contacts 225 and an obvious charging circuit is completed thereby.

With the next operation of the manual control push button 26, a positive pulse is again transmitted over the alternator control contacts 222, conductor 278, and resistance 390 to the common connection for the grids 313 and 317 of the alternator tubes 310 and 315. Accordingly, the first alternator tube is fired and the second alternator tube 315 is extinguished to effect the transmission of an operating pulse over even drive conductor to the second tube 325 of the counting chain.

It is apparent from the foregoing that the push button 26 replaces the automatic generator circuit 50 in its transmission of pulses to the alternator and enables the user to transmit individual pulses to the alternator and its dependent equipment for test purposes.

5.0 "In" pulse measurement

It is noted that the pulse measurement circuit in the set may be connected to test the output of any pulsing system by connecting same to the appropriate ones of the input conductor terminals 12, 13 and 14 of the test unit.

5.1 Percentage measurement

Specifically, in the use of the test equipment shown for the measurement of the percentage break ratio of the impulses received, the following procedure is in order:

a. Connect the exterior source of pulses to the "in" terminals (terminals 12 and 13 for an exterior loop circuit: terminal 13 for an exterior positive potential single wire drive).

b. Operate percentage speed test key 47 to the percentage position whereby contacts 122 and 123 are in the closed position.

c. Operate measuring key 42 to the in-pulse test position to effect the closure of contacts 111 and 113 and the application of the incoming pulses to the pulse test circuit.

d. The percentage break value is then read upon the meter.

5.2 Speed measurement

Speed measurement is made by operating the percentage-speed test key 47 inwardly to the speed position, whereupon contacts 122 and 123 are opened, and contacts 121 connect the incoming effective lead 171 over contacts 113, 121 and 126 to the meter 41 network circuit, which sample each pulse and provide a reading in pulses per second of the rate of receipt.

6.0 Test for "G" relays of selector switches

The use of the test equipment in establishing the norms of operation of individual relays of given switches such as a selector or a connector in an all-relay exchange is an important function of the test unit.

It is well known that successful operation of the automatic exchange is predicted on the ability of the switching units and the individual units thereof to operate within given time limits. Accordingly occasional routining and testing of these individual relays is an important consideration in the achievement of reliable telephone service.

The test equipment of the invention is especially useful for this purpose. A specific example of the utility of the test equipment is evidenced in the testing of the so-called "G" relays of an all-relay type selector switch of the type shown in the copending application which is identified by Serial No. 161,677, and which was filed May 12, 1950, by Arne Oxaal and assigned to the assignee of this invention.

The operation of a selector "G" relay is necessarily restricted within given operating times to insure proper holding of certain of the selector circuits. By testing a number of the "G" relays of an exchange, an average set of norms or limits may be established and all of the selector "G" relays may then be adjusted to these norms. Thus routining of the exchange thereafter will be extremely simplified and faulty equipment will be readily detected.

In more detail, the manner in which the test equipment is operative to test a so-called hold "G" relay 440S of a selector switch 130S of the type disclosed in the aforementioned application is now set forth.

Figure 8:
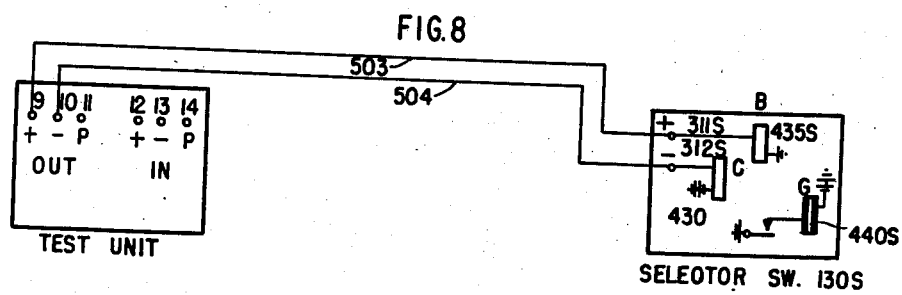

With reference to Figure 8, a selector switch of the type designated at 130 in the aforementioned copending application, is shown connected to the test unit. To avoid confusion between the identification numbers of the copending applications, the components of selector switch 130 are identified herein by the numbers assigned in the copending application as suffixed by the letter S. Further, only the effective relays in the test which include "B" relay 435S, C relay 430S, and G relay 445S, are shown in Figure 8.

Output terminals 9 and 10 of the test unit are connected to the positive and negative terminals 311S and 312S respectively, of the selector, by a pair of test conductors 503 and 504 prior to testing. Outline ohm key 29 on the test panel is moved to the 1000 position to thereby simulate the most demanding conditions encountered by the G relays (440S) of the selector or connector switches as used in an exchange; that is, a 1000 ohm line loop with no leak and no stations on the line.

The test equipment is then adjusted in the manner heretofore described to generate impulses at the rate of approximately 10 pulses per second. As the generator is adjusted to provide pulses at the desired speed, the measuring key 42 is returned to the normal position, and generated pulses are continuously transmitted over conductors 503 and 504 to the interconnected selector switch 130S.

The percentage control knob 18 is adjusted to a point at which the relay 440S is observed to flutter in an attempt to release. (Continued turning of the percentage knob in the same direction would cause the armature to pass through stages of heavy flutter, definite pulsing and eventually non-operation.)

When this point has been established the direction of movement of the percentage potentiometer 18 is reversed to the point where the flutter is just eliminated and the G relay 440S will hold. The measuring key 42 is then operated to the circulator pulse test position, the percentage speed test key to the percentage position, and the value of percentage is recorded, this reading being the highest percentage break for which the G relay 440S of the equipment will hold.

Similar testing of a large number of analogous G relays of a given telephone system installation will enable the test man to establish a threshold norm for the non-flutter condition of all the G relays, such as 440S, in the telephone exchange. The particular G relays which do not fall in line with the determined threshold are then adjusted to the threshold which has been established.

As a further test, normal line conditions are simulated by moving the out-line-ohm key 29 to the "500" position to thereby insert a 500 ohm resistance in the pulsing circuit which extends to the selector 130S. The test equipment is adjusted to generate impulses at a rate of 5 P. P. S. and the "flutter" and "hold" test are then repeated at five pulses per second. The values recorded during this second test establish a threshold suitable for use in establishing a band for routine testing. The band is created by providing a margin of safety in the direction of the holding, and by providing a differential of sufficient value to insure fluttering of the average relay and non-sticking of the relay on release. It is apparent that the transmission of the impulses at approximately five pulses per second acts as a magnifier of the inherent faults of the relays and provides a more precise means of measuring the operating characteristics of the slow operating relays.

Once the band of "hold" and "flutter" values has been established, the G relays which depart from the band values are reset and readjusted thereto and the problem of maintenance thereafter is greately simplified. That is, in a routine test thereafter, the maintenance man need merely connect the circulator to the selector by a pair of test leads, such as 503 and 504 and adjust the outline ohm key to the 500 ohm position. The circulator is then adjusted to generate a series of pulses at the rate of five pulses per second, and the G relay 440S of the interconnected selector switch 130S is tested for the "flutter" and "hold" values. Should the values fall outside the established band, the relay 440S is adjusted to bring it within the desired range.

Greater timing accuracy and exchange operation of a smoother nature is established in exchanges which are measured and adjusted to given norms in this manner.

Similar adjustment on the test floor of manufacturing companies, prior to delivery of the switches, is also helpful in providing an improved type switching equipment.

7.0  *Test for F relays of selectors (etc.)*

A transfer type relay, normally designated as the F relay of the conventional type selector or connector switches, is also desirably adjusted to operate within a range of predetermined operating periods.

Figure 9:
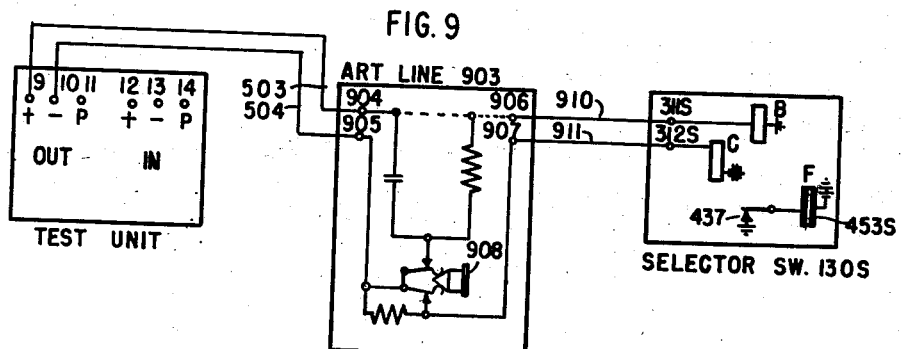

As shown in Figure 9, the testing of an F relay, such as 453S, of a selector or connector switch, such as 130S, is best effected through the aid of an artificial line unit 903, which is adjustable to simulate the most demanding conditions which an "F" relay may possibly encounter in the field, that is, a zero loop, a 10,000 ohm leak and maximum station's capacity on the line.

The test equipment "out" terminals 9 and 10 are connected by means of test conductors 503 and 504 to the positive and negative terminals 904 and 905 of an artificial line unit 903. The output terminals 906 and 907 of the artificial line unit 903 are connected by means of interconnecting conductors 910 and 911 to the positive and negative conductors 311S and 312S of the selector switch 130S to be tested.

The artificial line unit 903 may be of a conventional unit which is effective for operation of key 908 to connect a 10,000 ohm leak to the lines and simulate a condition of maximum station's capacity on the line. Only the relays of the selector 130S which are directly concerned with the test are again shown herein in Figure 9.

In the actual establishment of the norms of the F relay 453S, the test equipment and artificial line 903 are connected to the selector 130S as shown in Figure 9. The adjustable key unit 908 of the artificial line is operated and the zero line loop 10,000 ohm leak and the maximum station capacity condition is simulated. Out-line-ohm key 29 on the circulator test equipment is best adjusted to the zero position in this test.

The test equipment is now adjusted, in the manner heretofore described, to generate impulses at the rate of approximately 10 pulses per second. After adjustment, measuring key 42 is operated to its normal position and continuous pulses are transmitted over the interconnecting artificial line 903 to the selector 130S under test.

The percentage control knob 18 is varied to a point at which the F relay 453S just flutters in an attempt to restore. The direction of rotation of the percentage control knob 18 is then reversed to a point which just eliminates the flutter, allowing the F relay 453S to hold. Measuring key 42 is now operated to the circulator pulse position and the percentage reading appearing on meter 41 is noted, this reading representing the lowest percentage break for which the F relay will hold.

Similar tests may be made of a number of F relays, such as 453S in the exchange, and a threshold at which all of the F relays will hold with a non-flutter effect may then be established. The freak relays which do not operate within these values are then adjusted to bring them within the threshold established as a result of the testing of the large number of relays.

After adjustment of the relays of the system has been accomplished, 500 ohms are inserted in the out-pulsing loop of the test equipment by operating the outline ohm key 29 to the "500" position. Artificial line 903 is then removed, thus simulating somewhat normal line conditions, and the test equipment is then adjusted to transmit impulses at the rate of five pulses per second.

The "flutter" and "hold" tests are now repeated with the hold values being recorded to establish a threshold suitable for use in establishing a band for routine testing. As mentioned heretofore, the use of five impulses per second, rather than the conventional ten impulses per second, acts as a magnifier of the operating characteristics of the relay and permits a more precise measurement and adjustment of slow operating relays.

The band established is, of course, provided with a margin of safety in the direction of holding, and by providing a differential that will insure fluttering of the average relay, thus providing protection against non-sticking thereof on release.

Once the band has been established, routine testing may be readily accomplished thereafter by the maintenance man through use of the test equipment in the manner described. That is, in a routine test the test equipment need merely be connected to the selector to be tested, the out-line-ohm key 29 moved to the 500 ohm position, and the generator 50 adjusted to provide impulses at the rate of five pulses per second. The F relay values for flutter and hold are then adjusted to bring the relay within the desired range.

While the aforedescribed tests have been set forth as solutions to problems of maintenance men in the field, it is of course obvious that adjustment of the equipment prior to its shipment from the factory floor is also readily accomplished in this manner.

Also in installing new switches in expanding and established exchange or in adapting a given exchange for use with other established exchanges, similar tests will prove most helpful in establishing a uniform and smooth operating system.

8.0 Tests of repeater relay for pulse distortion

Trunk equipment, for example, used in the conventional type telephone exchanges is necessarily of the type which will relay pulses with a minimum or negligible amount of distortion. The ability of a given trunk unit to relay pulses without distortion is conveniently tested through the means of the test equipment of the disclosure and the connections for such test are set forth in Figure 10a.

As there shown a conventional trunk unit 1000 including a repeating relay 1001 are interconnected by a pair of test conductors 503 and 504 to the positive and negative terminal 9 and 10 of the test unit. Contacts 1002 of the repeating relay 1001 are connected by means of test conductors 1003 and 1004 to the positive and negative input terminals 12 and 13 of the test equipment.

In testing the repeating relay 1001 of the trunk equipment 1000, the test equipment is adjusted to transmit impulses, having a sixty percent break value, at the rate of ten pulses per second. With the measuring key 42 moved to its normal position and the repeat key in the "continuous" position to effect the transmission of continuous pulses over the "out" terminals 9 and 10 and over conductors 503 and 504 to the repeating relay 1001. Out line ohm key 29 is adjusted to the zero position for the test.

The percentage-speed key 47 is then operated to the percentage position and the measuring key 42 to the "in" position. Meter 41 now indicates the percentage break value of the incoming pulses as repeated by relay contacts 1002 over conductors 1003 and 1004 to the "in" test terminals 12 and 13. The indicated readings may be compared with the known output value of the test unit (which is adjusted to 60 percent break) and the repeating characteristics of repeat relay 1001 may be determined.

Similarly by moving the percentage speed key 47 to the speed position, the rate of receipt of the repeated impulses will be indicated by meter 41. The indicated reading is then compared with the test equipment output (10 P. P. S.) to further establish the repeating characteristics of relay 1001.

Tests of this nature are extremely important in adapting exchanges for linkage to inter-toll networks.

It might be noted that any appropriate conventional pulse test circuit may be connected to input lead and used in place of pulse test circuit 57.

9.0 Test of selector for stepping characteristics

Selector switches, or any other type of switch having a "first movement followed by hunting" type of operation, may be effectively and reliably tested for understepping and overstepping by the disclosed test equipment. In accomplishing the test, the test equipment is connected, in the manner shown in Figure 11, to the selector under test, the negative and P wire terminals, 10 and 11, of the test unit being connected to the negative and P wire terminals 312S and 313S of the selector switch 130S to be tested, by test conductors, such as 503 and 504. Additionally, a test conductor 505 is connected between the P wire of the selector switch 130S and the P wire terminal 14 on the input side of the test equipment.

The test equipment is then adjusted to transmit the telephone directory number 91 at approximately 10 pulses per second, the pulses having a break percentage ratio of 60 percent. The pulse key 27 is adjusted to the make pulse position, and the test equipment is adjusted to repeat, with the test key 31 in the non-test position.

As the switch repeatedly advances and hunts, the technician personally observes the switch for understepping or overstepping. Digit 9 is chosen as the number to be transmitted, so that the overstepping may be readily observed on switches having ten advances in their first movement.

It might be noted that the P-wire connections in conjunction with the off-normal ground from the selector prevent the resending of "91" until the switch has cleared as evidenced by the disappearance of said off-normal ground.

10.0 Balance test and dial tone test modifications

In a first modification of the test equipment, a balance test circuit 175 (Figure 11) for testing the balanced condition of a called line may be arranged for selective inclusion into tests of completed calls through an exchange by use of suitable key means, such as 21. The operation of the test equipment to continue its cycling when the balance test circuit 175 is included, is contingent upon the existence of a balanced line condition as well as the return of positive potential on the in-P-wire 172.

A second modification includes the addition of a dial tone test circuit 185 (Fig. 12) which, when used, makes the operation and impulse transmission by the test equipment contingent upon the receipt of dial phone tone through the line finders of the exchange under test.

Dial tone test key means 20 controls the use or non-use of the dial tone test circuit 185 as will appear more fully hereinafter.

10.1 Balance test circuit

Considering first the balance test equipment 175, it is apparent that operation of the balance key 21 on the control panel will effect at key contacts 176a, 177a and 178a, the interruption of the direct connection of the incoming conductors 170, 171 and 172 to the contacts of the measuring key 42 and contacts 201 of P-wire resistance key 30, and effect, instead, the routing of conductors 170, 171 and 172 over contacts 176a, 177a and 178a to the positive, negative and P wire terminals 176b, 177b and 178b of the balance test circuit 175.

A P-wire output terminal 179 on the balance test equipment 175 is connected to the incoming P wire circuit for the test unit at a point beyond the balance test key contacts 176.

With reference to Figure 11, there is shown thereat the circuit details of a balance test circuit 175 for use in test equipment. A line test relay 1100 is connected to the P wire terminal 178b and controls in its operation a circuit preparing relay 1105, a normal relay 1125 and a filter detector network 1107. Circuit preparing relay 1105 is connected to control a control tube 1115 for operation as a call is extended to the balance test circuit. The detector network 1107 comprises a series resistance 1108 and capacitor 1110 arranged for connection to the positive side of the line at terminal 176b and a series resistance 1110 and capacitor 1112 arranged for connection to the negative side of the line at terminal 177b. Capacitors 1110 and 1112 are connected to the output side of the network and the control grid 1117 of the control tube 1115.

The triode vacuum control tube 1115 comprises a plate 1116, a grid 1117 and a cathode 1118, the plate 1116 is connected over relay 1120 to a source of positive potential. Cathode 1118 is connected over cathode biasing resistor 1119 to a source of negative potential. The grid 1117 is connected over resistance 1113 to a source of negative potential and to the output side of the detector filter network 1107. A conductor 1106a which extends over contacts 1106 of the auxiliary relay 1105 to negative battery normally biases grid 1117 of the triode tube to negative condition and prevents the firing thereof responsive to the entrance of capacitive charges as the contacts 1101 and 1102 of the line test relay 1100 are closed.

Circuit control relay 1120 is connected in the plate circuit of the control tube 1115 and is operative with indication relay 1130 and normal relay 1125 to control illumination and extinguishment of indication lamps 1129, 1134 and 1135 in accordance with the line test results. Relay 1125 and 1130 also control the extension of ground over the in-P-wire to the circulator test equipment if the proper line balance is found to exist.

The values of the resistance 1113 and 1119 may be selected in accordance with the particular sensitivity of the unit which is desired. The elements of the network 1107 may be varied in accordance with the degree of quick suppression which is desired and in accordance with the tone volume obtainable over the circuits.

In use, the balance key 21 is moved to the test position, thereby connecting conductors 176, 177 and 178 to incoming terminals 170, 171 and 172 which extend to the subscriber line equipment under test. As the call is extended to the line under test, positive potential is placed on the P wire in conventional manner and is extended over P wire 172, contacts 176a and terminal 178b to test relay 1100.

Test relay 1100 operates, and at its contacts 1101 and 1102 extends the positive and negative conductors of the tested line to the detector network 1107.

Test relay 1100 at its contacts 1104 interrupts the operating circuit for normal relay 1125 to effect restoration thereof.

Circuit preparing relay 1105 operates over the loop circuit extended thereto and is effective at its contacts 1106 to interrupt the negative biasing potential normally extended to the firing grid 1117 of the control tube 1115. In the event that a balanced line condition exists, potential output of the network 1107 will be zero, and the control grid 1117 of the control vacuum tube 1115 will be maintained negatively biased by resistance 1113 and will be prevented from firing at this time.

After a predetermined time period, the slow-to-release normal relay 1125 restores and at its contacts 1126 introduces a capacitance unit 1136 into the lower section of the detector network 1107 which comprises resistance 1110 and capacitor 1112, whereby the detector network becomes unbalanced, and a positive potential is applied to the firing grid 1117 of the control triode vacuum tube 1115 to render the tube conductive.

As tube 1117 strikes, an operating circuit is completed for control relay 1120, the circuit extending over the anode cathode circuit of the now conductive tube 1115 and cathode resistance 1119 to negative battery.

Control relay 1120 operates and at its contacts 1121 completes a circuit connecting ground over the outgoing P wire terminal 179 to the test relay 240 of the test equipment, the circuit extending from positive battery over contacts 1103, 1121, 1127 and 1132 to outgoing terminal 179.

It is apparent that with the application of the positive potential to the test wire the test relay 240 will operate in the manner heretofore described to indicate to the attendant that the call has arrived at the desired stage and that a balanced line condition exists. Further cyclic operation of the test equipment continues in the manner heretofore described.

A further indication of the balanced line condition is provided by the "balanced line" indication lamp 1135, which is illuminated over a circuit extending from positive battery over contacts 1103, 1121, 1127 and 1132 and the indication lamp 1135 to negative battery as the control relay 1120 operates.

In the event that an unbalanced calling line is detected, a positive potential will immediately appear at the output side of the detector network 1107, and the control grid 1117 of the triode vacuum tube 1115 to render the tube conductive, as the circuit preparing relay 1105 operates to remove the normally applied negative biasing potential.

In that the triode vacuum tube 1115 strikes immediately after operation of circuit preparing relay 1105 in the event of an unbalanced line, the slow-to-release normal relay 1125 will be in the operated position. Also the operating circuit for control relay 1120 will be completed. As control relay 1120 now operates, it is effective at its contacts 1121 to complete an operating circuit for the indication relay 1130, the operating circuit for the indication relay 1130 extending from positive battery over contacts 1103, 1121 and 1128 of the slow-to-release relay 1125, the indication relay 1130 and negative battery. Additionally, the same operating circuit effects illumination of the "unbalanced" indication lamp 1134.

Indication relay 1130 operates and at its contacts 1132 interrupts a further point in the circuit to the in-P-wire terminal 179 and to the test equipment. The energizing circuit for the "balanced" condition indication lamp 1135 is also interrupted at a further point.

Indication relay 1130 at its contacts 1131, completes a self-holding circuit over contacts 1103 of the line test relay to prevent operation of the test equipment until the equipment under test has been released.

In the event that an open condition exists in the called line as extended to the balanced test equipment 175, line test relay 1100 operates to extend the incoming positive and negative conductors to the detector network 1107 for testing purposes in the manner previously described. Circuit preparing relay 1105 is operated and the circuit of normal relay 1125 is opened. Zero potential will appear at the output side of network 1107 as a result of the open line condition and a false "balance" condition is registered at the detector output side to cause the control vacuum tube 1115 to remain in a non-conductive state.

After a predetermined period of time, the slow-to-release normal relay 1125 restores, and at its contacts 1129 completes an operating circuit for the open indication lamp 1129, the circuit extending from positive battery over contacts 1103, 1122, and 1129 and the "open" indication lamp 1129 to negative battery. The equipment is held in this state until the open line condition is corrected or the call released.

As a further modification, the extension can be arranged to check ringing frequencies (using the last digit of the number) by using tuned detectors or comparison with taps which extend from the ringing supply.

It is apparent that the aforedescribed balance test circuit provides an extremely accurate and reliable means for testing the balanced condition of the called line and for preventing operation of the circulator in the event that an unbalanced line condition is detected. In addition the balance test circuit 175 provides a true visual indication of the various faulty conditions described as they arise in a calling line under test.

10.2 Dial tone test circuit

The dial tone test circuit 185 (Fig. 1b and Fig. 12) is operative, in its inclusion in the test equipment, to provide an optional delay of the test equipment operation pending receipt of dial tone from the exchange under test. The dial tone test arrangement has special utility in instances in which a test call is extended through a line finder link, and a delay in landing in the link is encountered.

An important feature of the dial tone test circuit 185 is the manner in which it renders reception of dial tone a necessary condition for further operation of the test equipment.

As shown in Figure 1b, the dial tone circuit 185 comprises a positive terminal 186 and a P wire terminal 187 which are arranged to be connected to the outgoing positive conductor 180 and the outgoing P wire 182 by suitable test conductor such as 186a and 187a.

The connection of the dial tone circuit 185 to control a point in the starting circuit for the test equipment is controlled by an associated dial tone test key 20, which is connected to the start circuit for the test equipment at a point which is prior to the pause adjustment circuit 58. As shown in Figure 2, a portion of the normal start circuit which is indicated by the dotted line, is replaced by conductors X and Y which extend through the normally open contacts 189b of the dial test key 20. Conductor Y extends over the normally closed contacts 189a to the dial start tone terminal 188 of the dial tone test equipment 185.

With the dial test key 20 in the normal position indicated in Figure 1a, the portion of the start circuit for the test equipment normally controlled by the contacts 154 and release relay 150 is disconnected and the dial tone circuit 185 is substituted therefor. In starting the equipment with the key 20 in the dial tone test position, operating potential for the start circuit is now necessarily applied by the dial tone circuit over conductor Y to the pause adjustment circuit 58.

With the test dial key 20 in its operated position, contacts 189b will be closed and conductors X and Y connect the start circuit for control by the release relay 150 at its contacts 154 in the normal manner.

The dial tone circuit 185 basically comprises a dial tone responsive unit which applies ground over a dial start terminal 188 to the start circuit for the test equipment only in the event that dial tone is received over the P wire terminal 11 of the test equipment.

The dial tone circuit 185 in a preferred embodiment is shown in Figure 12. As there illustrated a positive terminal 186 and a P-wire terminal 187 are arranged for connection to the test equipment in the manner heretofore described. The circuit basically comprises a control gaseous tube 1200 having a plate or anode 1201, a screen grid 1202, a control grid 1203, and a cathode 1204. Plate 1201 is directly connected to conductor 182 and the P wire terminal 11 of the test equipment. Cathode 1204 is connected to a source of negative potential over an adjustable resistance 1205 which may be in the order of 5000 ohms and a resistor 1206 which may be in the order of 2200 ohms. The output dial start terminal 188 is connected to the junction point for the resistances 1205 and 1206.

Screen grid 1202 is connected directly to the cathode circuit. Control grid 1203 is connected to the positive terminal 186 over capacitor 1211, resistance 1210, rectifier 1209. A tank condenser 1212 is connected between the control grid 1203 and rectifier 1209 in the input circuit and a source of negative potential. Control grid 1203 is connected to the plate 1201 by means of resistance 1207 which is in the nature of 47,000 ohms, and is connected to the variable resistor 1205 in the cathode circuit by means of 100,000 ohm resistor 1208.

In placing the dial tone circuit in operation, the dial tone key 20 is moved to the dial tone position whereby contacts 189b are open to interrupt the normal start circuit as controlled by the release relay 150 and to substitute therefor the start circuit as controlled by the dial tone circuit 185 through contacts 189a.

Landing of the call in the line finder link by the test equipment is accomplished in the manner heretofore described.

As a call is landed on the test line, release relay 150 restores, as previously disclosed, and at its contacts 152 connects positive potential to conductor 182 and the P wire 11 of the test equipment. Positive potential is also extended over conductor 187a to the interconnected P wire terminal 187 of the dial tone circuit 185 and the plate 1201 of the control tube 1200 for the dial tone test circuit. Plate 1201 is accordingly energized at a value of approximately 50 volts positive with respect to negative battery terminal.

As dial tone is applied over the positive conductor of the line to terminal 9 of the test equipment, the input circuit for the control grid 1203 is energized over conductors 180 and 186a, and the positive terminal 186 of the dial tone circuit 185, capacitor 1211, resistance 1210 and rectifier 1209 to the tank condenser 1212 which stores the incoming dial tone pulses until such time as the firing potential of the control grid 1203 is reached.

The control tube 1200 is rendered conductive as the firing potential therefor is reached and the potential of the cathode 1204 rises to about 40 volts positive to cause an operating potential to be applied over the outgoing dial start terminal 138, contacts 189a and conductor Y to the pause adjustment circuit 58. The firing grid 483 for the start tube 489 of the test equipment is driven positive thereby to fire the start tube 489, and initiate operation of the test equipment, in the manner heretofore described.

As the link is subsequently released and the switchboard removes ground from the P wire 182, release relay 150 is deenergized to open its contacts 152 and remove positive potential from the P wire terminal 187 to the dial tone circuit 185. Control tube 1200 thereof is accordingly extinguished and the dial tone circuit 185 is prepared for a subsequent recycling operation.

11.0 Conclusion

The test equipment of the foregoing disclosure is extremely versatile and flexible in measuring and testing the operating characteristics of impulse responsive equipment. The many applications of the equipment as set forth in the specification heretofore are only partially indicative of the tremendous utility of the equipment, it being apparent that use thereof in the field will bring to light many further methods and modes of use by those who are versed in the art.

The importance of the equipment in the telephone field will become evident to the installer, maintenance and factory men who are daily required to provide solutions to difficult switching problems. Other fields, as well, will find special benefits in use of the testing equipment for such purposes.

The portable nature, compactness, and comparative light weight of the testing device renders the unit especially desirable for field work. Additionally, the tremendous scope of its applications in testing, measuring, routining, installing and "cutover" work renders the device an invaluable tool to parties engaged in the automatic switching art.

Various other features which are believed to be new are set forth in the accompanying claims.

What is claimed is:

1. In a portable device for testing impulse responsive equipment, generator means for providing test impulses at various predetermined rates of speed and having means for varying the make and break to total ratios of the generated impulses, starting means for initiating operation of said generator means, a series of unit members connected in a counting chain, means for operating said counting chain members in sequence to count the impulses as generated by said generator means, switch means adjustable to a plurality of predetermined, numerically-identified positions, and circuit control means for terminating operation of said generator means responsive to operation of a number of successive members of said counting chain which is commensurate with the numerical position of said switch means.

2. In a device for testing impulse responsive equipment, an impulse generator means adjustable to provide test impulses at various predetermined rates of speed and various percentage make and break to total ratios, and a plurality of switch means, each being adjustable to various numerically-identified positions and operative in its adjustment to determine the number of said preadjusted test impulses to be generated by said generator in the transmission of the number registered on said switch means.

3. In a device for testing impulse responsive equipment, generator means for providing test impulses at a predetermined rate of speed and at various make and break to total ratios, and a plurality of switch means, each being adjustable to various numerically-identified positions and operative in its adjustment to determine the number of said preadjusted test impulses to be generated by said generator means in the transmission of a corresponding digit, start means for said device, and sequence control means operative with operation of said start means to render each of said switch means effective in a predetermined sequence.

4. In a device for testing impulse responsive equipment, said device having generator means for providing test impulses which includes adjustable circuit means for varying the rate of speed and the make and break to total ratio of the test impulses, starting means for initiating operation of said generating means, a plurality of switch means, each being adjustable to various ones of numerically-identified positions for determining the number of said preadjusted impulses in an associated digit in a digit train, sequence control means for rendering each of the switch means effective in a predetermined sequence, and circuit control means for stopping the generator for a predetermined time period between generation of each of the successive ones of said digits.

5. A device as set forth in claim 4 in which said circuit control means includes adjustable pause means for varying said period of pause provided between the successive digit transmissions.

6. In a testing device having generator means for providing test impulses which includes means for varying the rate of speed and the make and break to total ratio of the generated test pulses, a plurality of sequentially-arranged digit switch means, each being adjustable to various ones of numerically-identified positions for determining the number of impulses to be generated for an associated sequential digit in a digit train, and a cycle switch member adjustable to a plurality of positions for determining the number of said digit switches to be rendered effective in each digit train transmission.

7. In a testing device having generator means for providing test impulses which includes means for varying the rate of speed and the make and break to total ratio of the generated test pulses, a plurality of sequentially arranged digit switch means, each being adjustable to various numerically identified positions for determining the number of impulses to be generated for an associated sequential digit in a given digit train, switch means adjustable to a plurality of positions for determining the number of digit switches in the sequence arrangement to be effectively operated in each given cycle of the equipment, and circuit control means for controlling operation of said generator as determined by said sequence and digit switch settings, said circuit control means including key circuit control means which are operative, in a given position, to effect repeated cyclic transmission of the digit train registered on said digit cycle switches.

8. In a testing device having generator means for providing test impulses which includes means for varying the rate of speed, and the make and break to total impulse ratio of the generated test pulses, a plurality of sequentially arranged digit switch means, each being adjustable to various numerically-identified positions for determining the number of impulses to be generated for an associated sequential digit in a given digit train, switch means adjustable to a plurality of positions for determining the number of digit switches in the sequence arrangement to be effectively operated in each given cycle of the equipment, and circuit control means for operating said generator to transmit said digits as registered on said sequence and digit switches with a predetermined pause period between digit transmisisons, said circuit control means including key means which is operative a predetermined time period after transmission of the digit train registered on said digit and cycle switches to repeat the transmission of said train, and pause control means which is operative to adjust the value of said intercyclic pause period and said interdigit pause period.

9. A device as claimed in claim 8 in which said variations in said intercycle and interdigit pause periods are controlled by a common switch member and said intercycle pause period is never less than said interdigit pause period.

10. In a device for testing impulse responsive equipment, generator means for providing test impulses, electronic counting chain means for counting said impulses as generated, alternator means for driving said electronic counting chain in a given sequence comprising a pair of gaseous tubes arranged for alternative operation responsive to impulse generation by said generator means, and switch means adjustable to a plurality of positions to determine in its adjustment the number of members of said counting chain to be operated with each impulse set generated by said impulse generator.

11. In a device for testing impulse responsive equipment, generator means for providing test impulses at its output side, alternator means having an input circuit which is connected to said generator means to be operatively controlled thereby, an output circuit for said alternator extending over a first and second drive conductor, said alternator being operative with receipt of the first impulse over its input circuit to transmit an operating pulse over said first drive conductor and operative with receipt of a second pulse to transmit an operating pulse over said second drive conductor, a plurality of members connected in a counting chain arrangement means connected to operate a successive member of said chain responsive to each application of a pulse to one of said drive conductors, switch means for registering the number of impulses to be generated for a given digit, and circuit control means operative to terminate operation of said generator as the members of said counting chain are successively operated to count off a number of impulses commensurate with the value of the digit registered on said switch, said circuit control means including reset means for resetting said alternator to a predetermined zero start point responsive to completion of the transmission of the registered digit.

12. In a testing device having generator means for providing test impulses, control means for controlling the number of impulses generated in a given operation of said generator means comprising alternator means arranged to respond to said generated impulses to impress a positive potential alternatively on one of two drive conductors, a counting chain for counting said impulses as generated comprising a plurality of gaseous tube units arranged in a given sequence, each of which tubes has two control grids, the first of said sequence tubes normally having one of its grids positively biassed and the other of its grids negatively biassed, the remaining tubes of said sequence normally having both control grids negatively biassed; said other control grid of said first tube and one of said control grids of each of the odd numbered tubes of the sequence being connected to one of said drive conductors, one of said grids of each of the even numbered tubes in the sequence being connected to the other of said drive conductors, said alternator being operative to apply a positive pulse to said one drive conductor with generation of the first pulse, whereby both control grids of said first tube are driven positive to effect firing of the first sequence tube, and means connected between the first and second tubes in the sequence which are operated with firing of the first tube to drive positive a control grid of the succeeding tube to prepare the following tube for operation in response to receipt of the next operating pulse on said other drive conductor.

13. In a device for testing impulse responsive equipment, generator means for providing test impulses, a plurality of members connected in a counting chain arrangement for counting said impulses as generated, a plurality of digit switch means, each adjustable to a number of predetermined, numerically-identified positions for registering and determining the value of each of the digits to be transmitted in a given cycle, sequence control means for sequentially rendering effective each of the switch means, and cycle switch means adjustable to a plurality of positions for determining the number of said digit switches to be rendered effective in said cycle, said sequence control means comprising a plurality of gas tubes each of which is individual to an associated digit switch, the first tube of the sequence being normally prepared for operation and being effectively operated responsive to operation of a successive number of members of the counting chain which is equivalent to the number registered on its associated digit switch, and network means connected between successive tubes in the sequence chain which are operative with striking of the preceding tube to prepare operation of the succeeding sequence tube.

14. An arrangement as claimed in claim 13 in which timing means are included in said interconnecting network to delay preparation of the succeeding tube until a predetermined period of time has elapsed following striking of the preceding tube in the sequence.

15. In a testing device having generator means for providing test impulses, a series of members connected in a counting chain arrangement to count the impulses as generated by said generating means, a plurality of sequentially arranged digit switch means, each being adjustable to various numerically identified positions for registering and determining the number of impulses to be generated for an associated sequential digit in a digit train, cycle switch means operative to determine the number of digit switches to be rendered effective in a given cycle of the equipment, sequence means for rendering each of said digit switches effective in a predetermined sequence and control circuit means including a stop-start circuit for controlling operation of said generator in accordance with the settings on said digit switches, said stop-start circuit comprising a pair of gaseous tubes, one of said tubes being arranged for control by each switch as rendered effective to terminate operation of said generator with operation of a number of the counting chain members which corresponds to the sequential number registered on the effective switch, the other of said tubes being operative to initiate operation of said generating means and terminate control by said first tube as controlled by said control circuit means.

16. In a device for testing impulse responsive equipment, generator means for providing test impulses, a plurality of members connected in a counting chain arrangement for counting said test impulses, alternator means controlled by said generator means for driving said counting chain in a given sequence as said impulses are generated, switch means for registering the number of impulses to be generated for each of the digits to be transmitted by said test device, sequence control means for rendering each switch effective in a predetermined sequence, and circuit control means operative to terminate operation of said generator with operation of a number of members of said counting chain to count off a number of impulses commensurate with the setting on the effective one of the switches, said circuit control means including a reset relay which is operative with each completion of the transmission of the digit registered on the effective switch to terminate operation of said generator, to reset said alternator and said counting chain to a given zero starting point, and to introduce a predetermined time delay prior to transmission of the following digit.

17. In a device for testing impulse responsive equipment which is arranged to be connected over an outgoing terminal set of equipment to be tested, generator means for providing test impulses at various speeds and various make and break to total impulse ratios for transmission over said outgoing terminal set, a number of electronic members connected in a counting chain arrangement for counting said test impulses, alternator means for driving said electronic counting chain in a given sequence as said impulses are generated, switch means for registering the number of impulses to be generated for each of the digits to be transmitted by said test device, sequence control means for rendering each switch effective in a predetermined sequence, and circuit control means operative to terminate operation of said generator as a number of members of said counting chain are operated to count off a number of impulses commensurate with the setting on the effective one of the switches, said circuit control means including a release relay which is arranged to be normally energized to prevent operation of the generator equipment, switch start means for interrupting the energizing circuit for said normally operated release relay to effect the restoration thereof, and means controlled by the release relay in its restoration to initiate operation of the generator equipment and to extend a loop over said outgoing terminals to the equipment under test to effect the seizure thereof.

18. A test device as set forth in claim 17 which includes means for maintaining said release relay restored until the final digit of the train has been transmitted, to thereby maintain the equipment under test seized until the entire registered calling number has been extended thereto.

19. In a device for testing impulse responsive equipment, said device having a set of output terminals for connecting the impulse output of the set to a vacant line, and a set of input terminals for connecting the P wire of a predetermined called line to the test device to test the ability of the switches of an automatic telephony exchange to arrive at a desired point, generator means for providing test impulses for transmission over said outgoing terminal set, switch means for registering the number of a desired line in the exchange, means for seizing said vacant line and controlling said generator means to transmit said registered number over said seized line, and a test relay operative to effect release of said seized line with appearance of operating potential on said input terminal responsive to extension of the call to the desired line by said exchange switches.

20. A device as claimed in claim 19 which includes switch means for selectively by-passing said test relay connection to said incoming terminal, said by-pass connection effecting repeated transmission of the registered number independent of appearance of operating potential over said incoming terminal.

21. A device as set forth in claim 19 which includes means for energizing an alarm circuit with the absence of potential on said incoming terminal following transmission of the final digit of the registered number, and for terminating recycling of the equipment.

22. In a portable type device for testing impulse responsive equipment, generator means for providing test impulses including a first means for varying the rate of speed of the generated impulses and a second means for varying the make and break to total ratio of the generated impulses, pulse test means for measuring the rate of speed of the impulses as generated and for measuring the percentage break ratio of the generated impulses, input and output terminals for said device to connect same to the equipment to be tested; and switch means operative to each of three positions, said switch means being operative in its first position to connect said impulses as generated by said generator means to said pulse test means for measuring purposes, said switch means operative in its second position to connect said pulses as generated by said generator means to said output terminal and the equipment under test, and said switch means being operative in said third position to connect the impulses as generated by said generator means to the equipment under test, and to connect said input terminal to said pulse measuring apparatus, whereby impulses of the equipment under test as received thereat may be accurately measured and compared with those as transmitted by the test device.

23. In a device for testing impulse responsive equipment, generator means for providing test impulses which generator means include a first means for adjusting the rate of impulse generation and a second means for adjusting the percentage make and break to total impulse ratio of the generated impulses, a plurality of switch means for registering a desired number of one or more digits, control means for controlling said generator means to generate impulses representative of the registered digits, a set of outgoing terminals for connecting the impulse output of said generator means to impulse responsive equipment to be tested, and switch alternating means for effecting transmission of said generated pulses to said outgoing terminals over a metallic loop pulsing circuit or a single wire pulsing circuit.

24. An arrangement as claimed in claim 23 which includes a second switch means for alternatively adjusting said pulsing circuit to a normally open or normally closed condition.

25. A testing device as claimed in claim 19 which includes switch means operative in one position to condition said test relay for operation with appearance of positive pulse at said input terminal and operative in a second position to condition said test relay for operation with appearance of a negative pulse at said input terminal.

26. A device as claimed in claim 19 which includes means for varying the value of resistance in the circuit between said incoming terminal and said test relay.

27. In a device for testing impulse responsive equipment, an impulse generator means adjustable to provide test impulses, a plurality of switch means adjustable to various numerically identified positions to register the several digits of a desired calling number, circuit control means for effecting operation of said generator to transmit said registered digits and for terminating operation of the generator as each of the registered digits is transmitted, key switch means operative to each of three positions for controlling the nature of the transmission of the registered number, said key switch means being operative in a first position to effect a single transmission of the registered number followed by termination of impulse transmission, said switch being operative in a second position to effect the repeated transmission of said registered number, and said switch being operative in a third position to effect the continuous transmission of impulses by said generator means independent of the settings on said digit switch means.

28. In a device for testing impulse responsive equipment, an impulse generator means adjustable to provide test impulses at various predetermined rates of speeds and various percentage make and break to total ratios, a plurality of switch means each being adjustable to various numerically identified positions to register a train of digits for transmission by said generator, and manually controlled switch means effective with each given operation thereof to control said generator to transmit only a single digit of the registered number, said single digits being transmitted in the sequence registered.

29. In a device for testing impulse responsive equipment, which device has generator means for providing test impulses, a counting chain means for counting said impulses as generated, alternator means for driving said counting chain in a given sequence, switch means adjustable to a plurality of positions to determine the furthermost point of advancement of said counting chain with operation thereof, and manually controlled means for transmitting individual pulses to said alternator independent of said generator for checking the operation of said alternator, said counting chain and said switch means.

30. In a device for testing impulse responsive equipment, in a telephone exchange, said device having a set of output terminals for connecting the impulse output of the device to a vacant line of the exchange and a set of input terminals on said device for connecting the test wire of a predetermined called line of the exchange to the test device for the purpose of checking the accuracy of the switches of the exchange in arriving at a desired point under known test conditions, generator means for providing test impulses for transmission over said outgoing terminal set, switch means for registering the number of a desired line in the exchange, means for seizing said vacant line and controlling said generator means to transmit said registered number over said seized line, and a dial tone test circuit connected to said output terminals which is operative to prevent operation of the generator equipment pending receipt of dial tone from the equipment under test.

31. In a device for testing impulse responsive equipment, generator means for providing test impulses, switch means for registering the digits of a desired calling number thereon, means for effecting operation of said generator to transmit said registered number in repeated cyclic manner to said interconnected switch equipment, a balance test unit including detector means operative upon the termination of the transmission of each digit to test the called line for a balanced condition, and circuit control means operative to effect termination of the operation of said test equipment in the event that an unbalanced line condition is detected.

32. In a device for testing impulse responsive equipment, generator means for providing test impulses, alternator means having an input circuit which is connected to said generator means to be operatively controlled thereby, an output circuit for said alternator extending over a first and second drive conductor, said alternator being operative with receipt of each odd numbered impulse of a set over its input circuit to transmit an operating pulse over said first drive conductor and operative with each receipt of an even numbered impulse of a set to transmit an operating pulse over said second drive conductor, a plurality of members connected in a counting chain arrangement, means connected to operate a successive member of said chain responsive to each application of a pulse to one of said drive conductors, switch means for registering the number of impulses to be generated for a given digit, and circuit control means operative to terminate operation of said generator as a number of counting chain members are successively operated to count off the number of impulses commensurate with the value of the digit registered on said switch.

References Cited in the file of this patent

UNITED STATES PATENTS

| Number | Name | Date |
| --- | --- | --- |
| 1,853,022 | Allison et al. | Apr. 12, 1932 |
| 1,854,456 | Deakin et al. | Apr. 12, 1932 |
| 2,006,472 | Miller | July 2, 1935 |
| 2,293,611 | Meeds | Aug. 18, 1942 |
| 2,411,648 | Brauer et al. | Nov. 26, 1946 |